(12) United States Patent
Borkowski et al.

(10) Patent No.: US 12,287,918 B2
(45) Date of Patent: Apr. 29, 2025

(54) BRAIN ACTIVITY MONITORING BASED MESSAGING AND COMMAND SYSTEM

(71) Applicants: Timothy Lance Borkowski, Philadelphia, PA (US); James Joseph Woods, Chelmsford, MA (US)

(72) Inventors: Timothy Lance Borkowski, Philadelphia, PA (US); James Joseph Woods, Chelmsford, MA (US)

(*) Notice: Subject to any disclaimer, the term of this patent is extended or adjusted under 35 U.S.C. 154(b) by 0 days.

(21) Appl. No.: 18/513,834

(22) Filed: Nov. 20, 2023

(65) Prior Publication Data

US 2024/0168553 A1 May 23, 2024

Related U.S. Application Data

(60) Provisional application No. 63/385,397, filed on Nov. 29, 2022, provisional application No. 63/384,360, filed on Nov. 18, 2022.

(51) Int. Cl.
*G06F 3/01* (2006.01)

(52) U.S. Cl.
CPC .................... *G06F 3/015* (2013.01)

(58) Field of Classification Search
CPC ...................................................... G06F 3/015
See application file for complete search history.

(56) References Cited

U.S. PATENT DOCUMENTS

| | | | |
|---|---|---|---|
| 5,638,826 A | 6/1997 | Wolpaw et al. | |
| 5,840,040 A * | 11/1998 | Altschuler | A61B 5/374 600/545 |
| 6,529,773 B1 | 3/2003 | Dewan | |
| 8,157,609 B2 | 4/2012 | Hallaian et al. | |
| 10,684,686 B1 | 6/2020 | Milstein | |
| 2007/0167933 A1 | 7/2007 | Camus | |
| 2015/0080753 A1 | 3/2015 | Miyazaki et al. | |
| 2015/0338917 A1 | 11/2015 | Steiner et al. | |
| 2016/0287119 A1 | 10/2016 | Low | |
| 2019/0099896 A1* | 4/2019 | Starr | B25J 11/008 |
| 2019/0220188 A1* | 7/2019 | Pham | G06F 3/013 |
| 2020/0138323 A1 | 5/2020 | Intrator | |

(Continued)

OTHER PUBLICATIONS

Jacques J. Vidal, "Toward Direct Brain-Computer Communication", Annual Review of Biophysics and Bioengineering, Jun. 1973, pp. 157-180, vol. 2, Annual Reviews, USA.

(Continued)

*Primary Examiner* — Hong Zhou

(57) ABSTRACT

Systems and methods are provided, which may be associated with brain computer interface (BCI), and which may use brain activity monitoring data in determining output for presenting a message or implementing a command on a device or system. Two or more signals may be obtained from a user, each generated by the user at least in part by the user engaging in specific thinking to cause value(s) of parameter(s) relating to the brain activity of the user to meet specified condition(s), where that which is thought in the specific thinking is not required to be related to the message or the command. The signals may be used in determining data values that may be used in determining a set of data values. The set of data values may be used in determining the message for presentation or the command for implementation on a system or device.

23 Claims, 17 Drawing Sheets

(56) References Cited

U.S. PATENT DOCUMENTS

| | | | |
|---|---|---|---|
| 2022/0253024 A1 | 8/2022 | Oxley et al. | |
| 2022/0276707 A1* | 9/2022 | Barascud | G06F 18/214 |
| 2022/0300075 A1 | 9/2022 | Baber et al. | |
| 2023/0152901 A1* | 5/2023 | Idestam-Almquist | G06F 3/017 |
| | | | 345/156 |

OTHER PUBLICATIONS

Pete Vilmer, "Mysterious 'Force Trainer' Toy Explained", starwars.com (http://starwars.com/vault/collecting/20090209b.html), Feb. 9, 2009, Lucas Online; archived at Wayback Machine (https://web.archive.org/web/20090211122524/http://starwars.com/vault/collecting/20090209b.html); citing a capture dated Feb. 11, 2009.

K. Amarasinghe, et al., "EEG based brain activity monitoring using Artificial Neural Networks", 2014 7th International Conference on Human System Interactions (HSI), Date of Conference: Jun. 16-18, 2014.

* cited by examiner

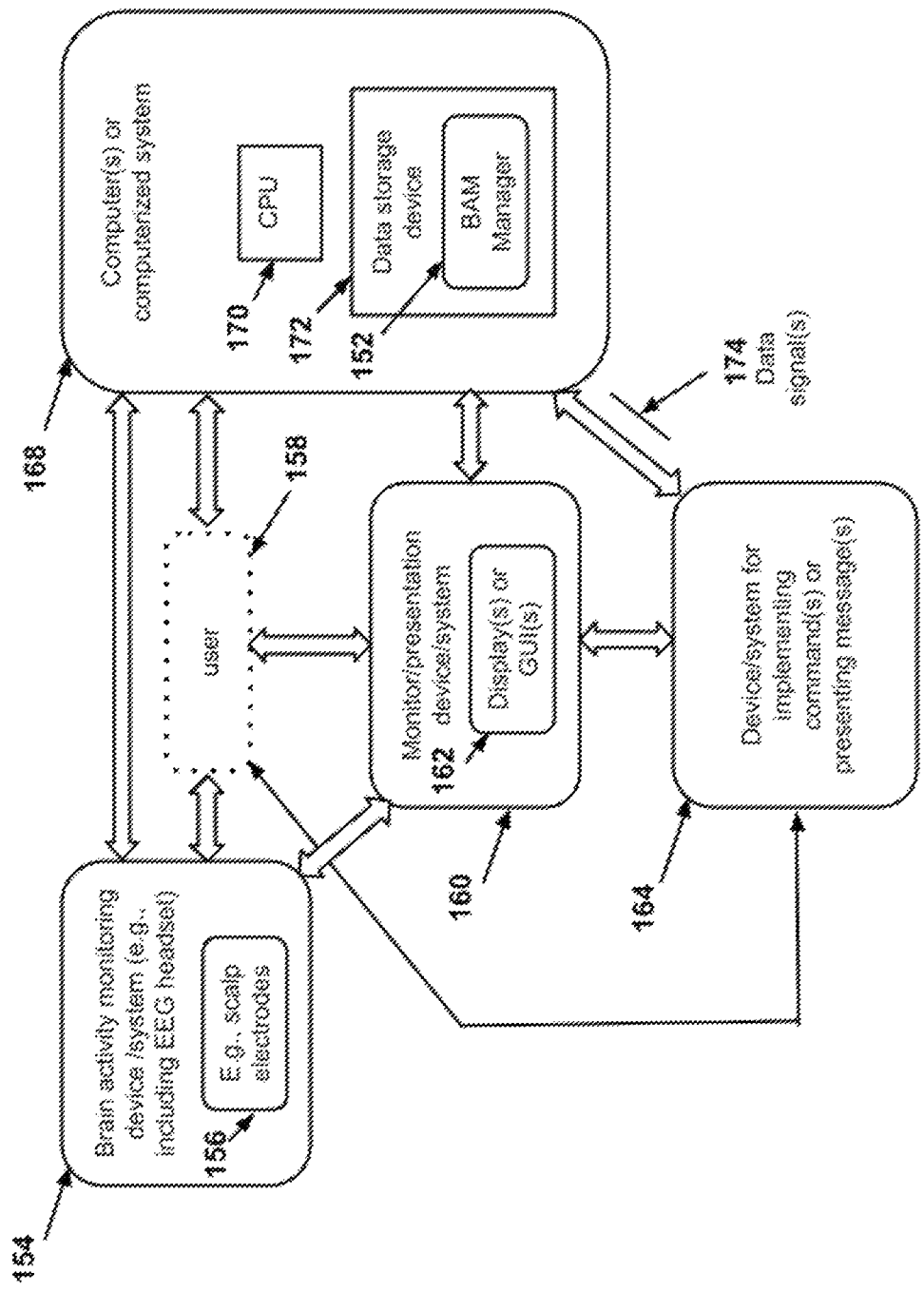

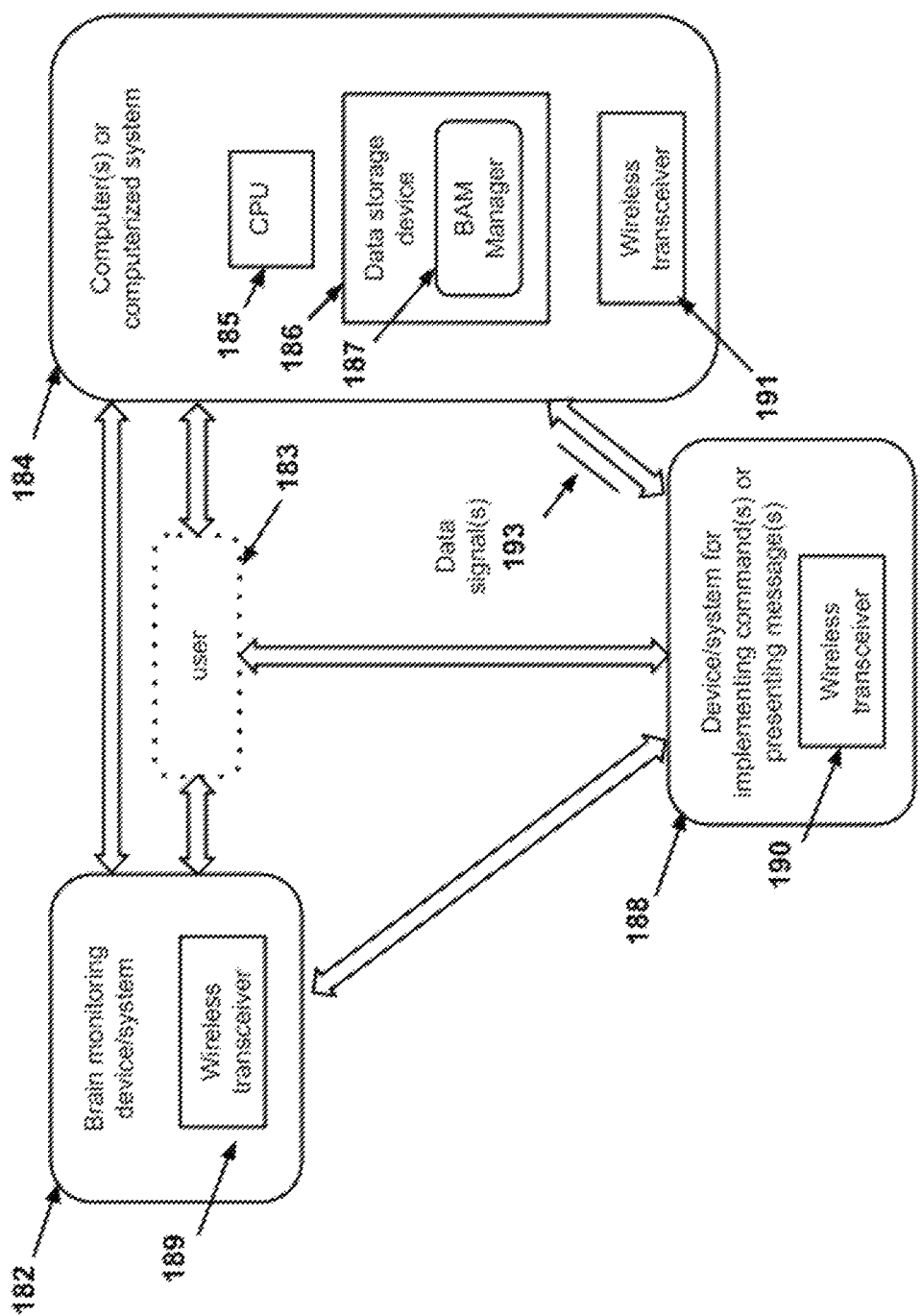

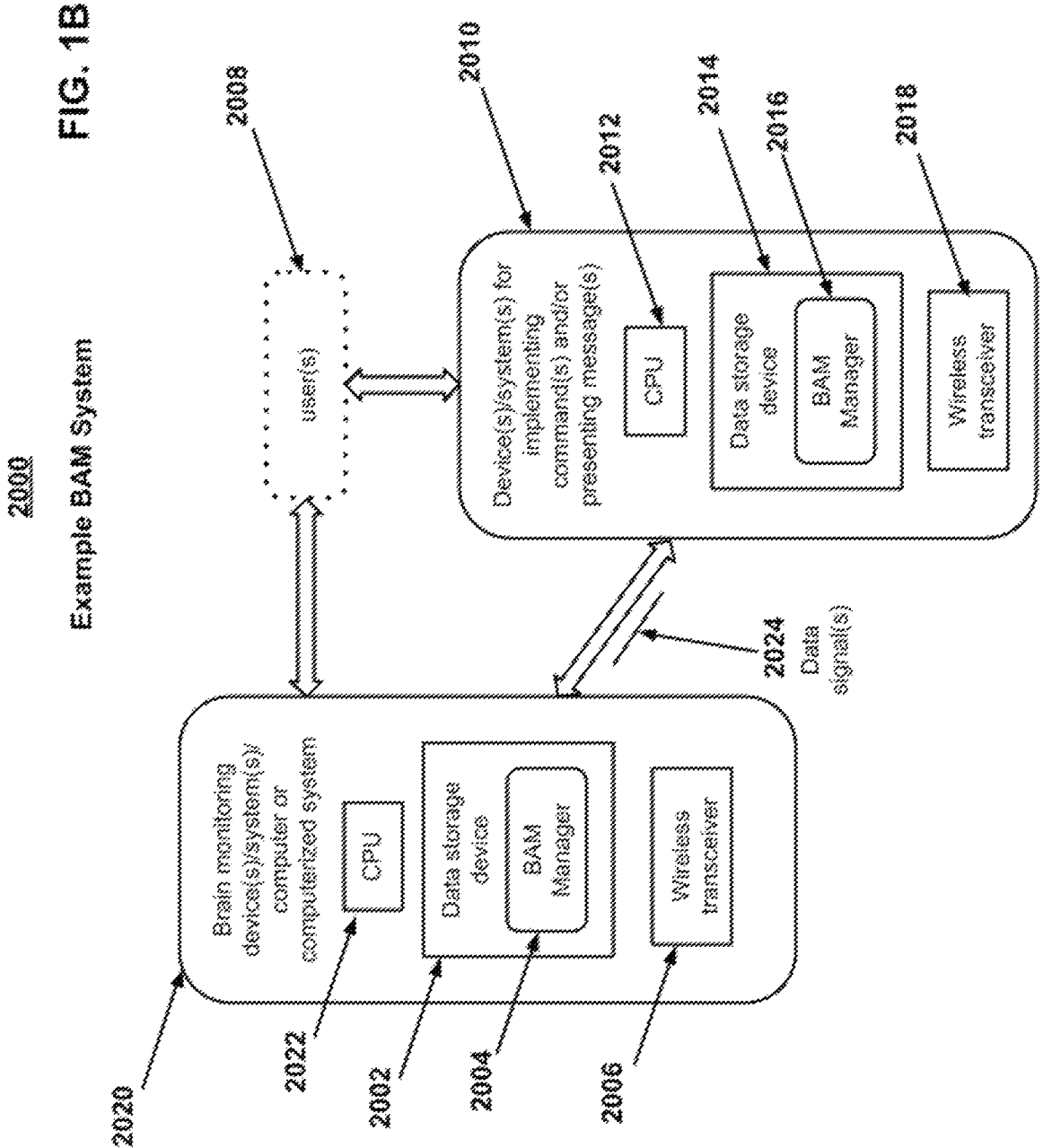

Example BAM System

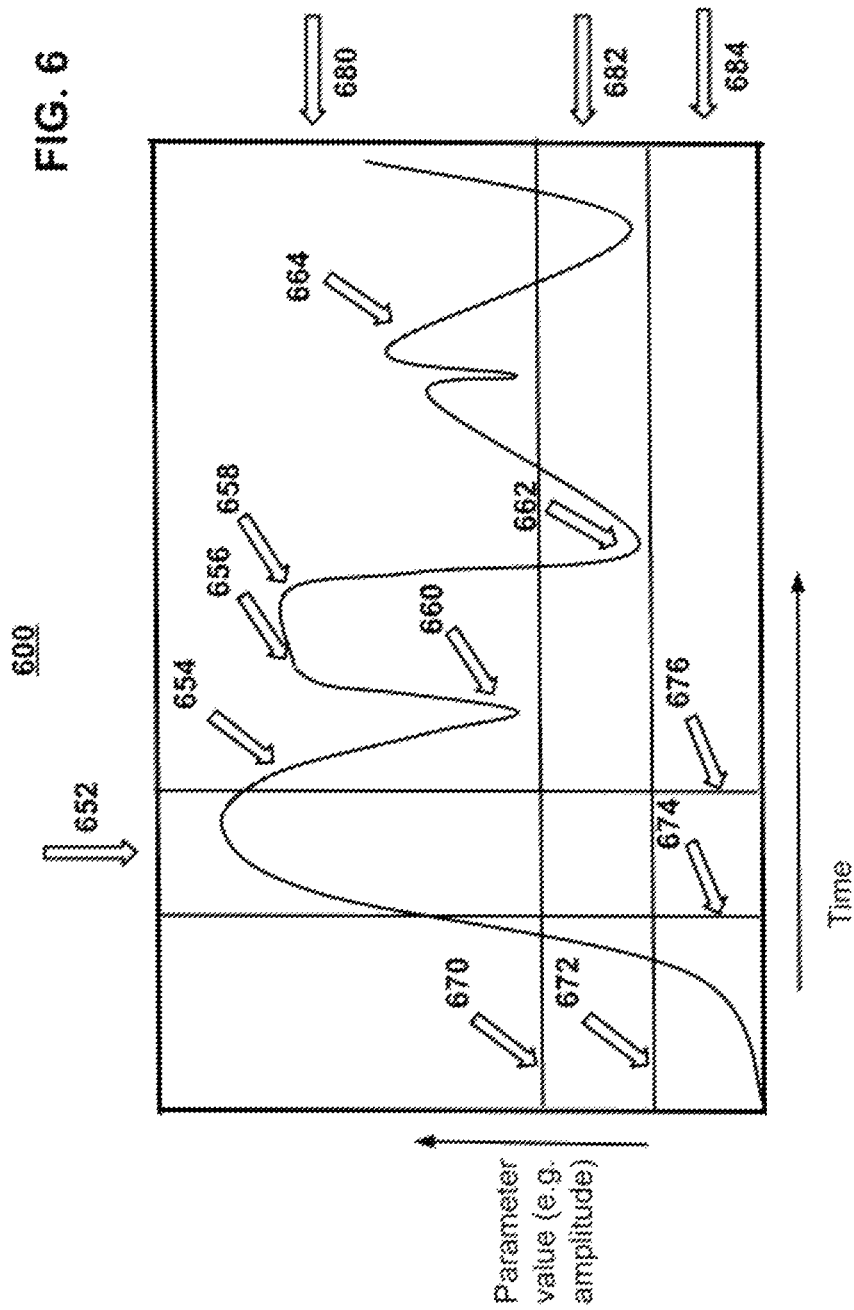

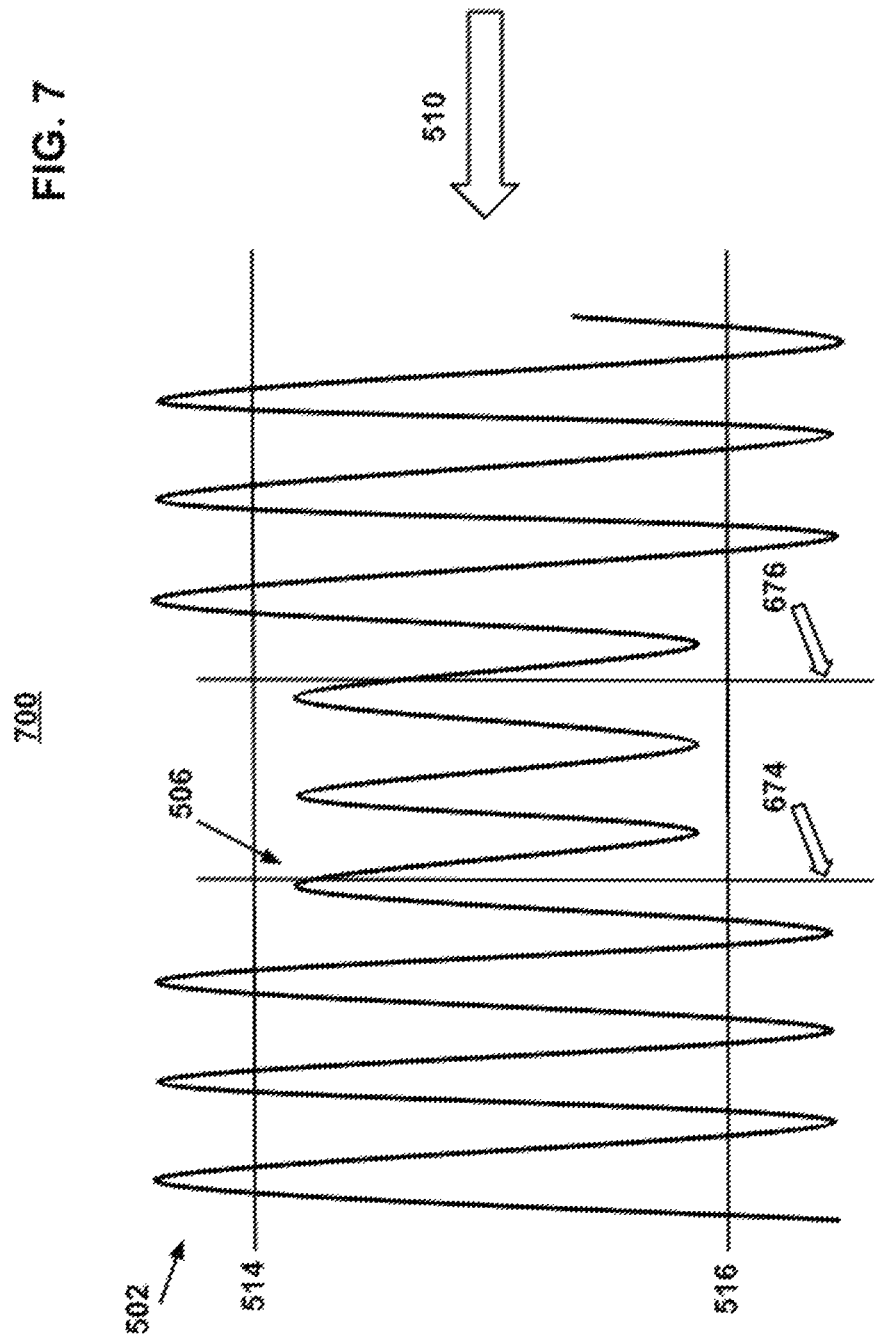

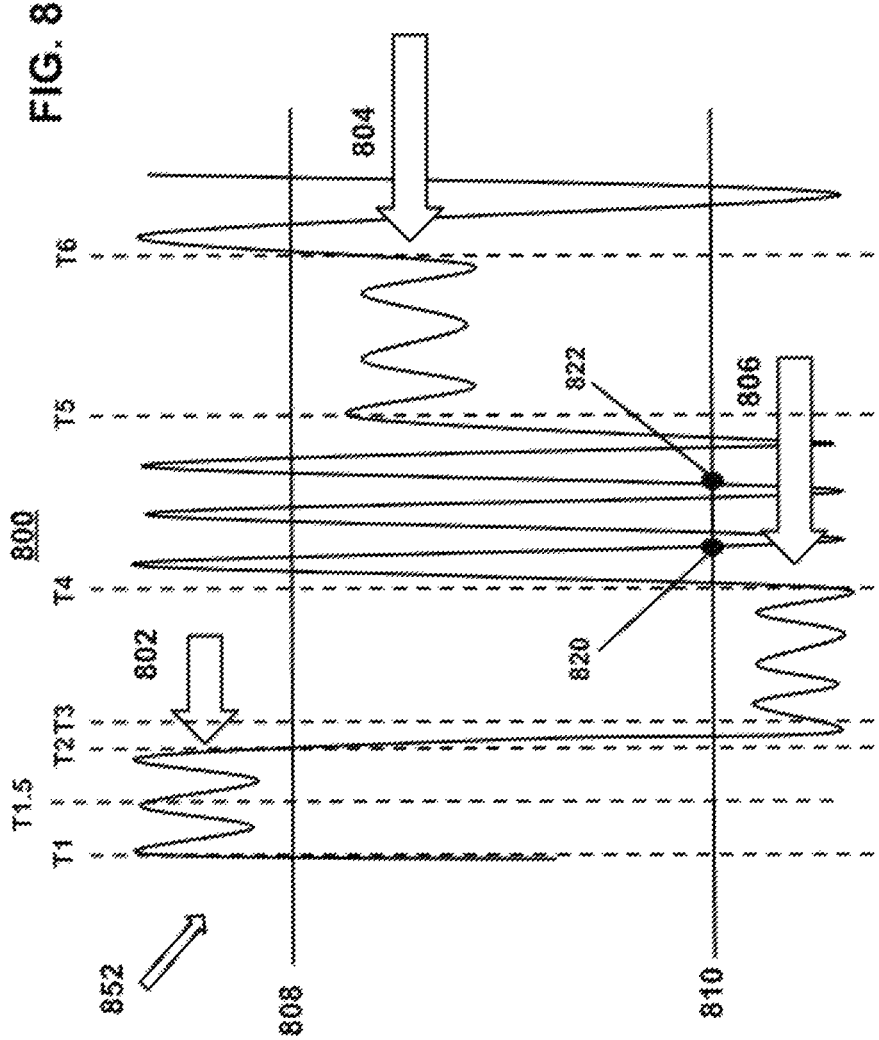

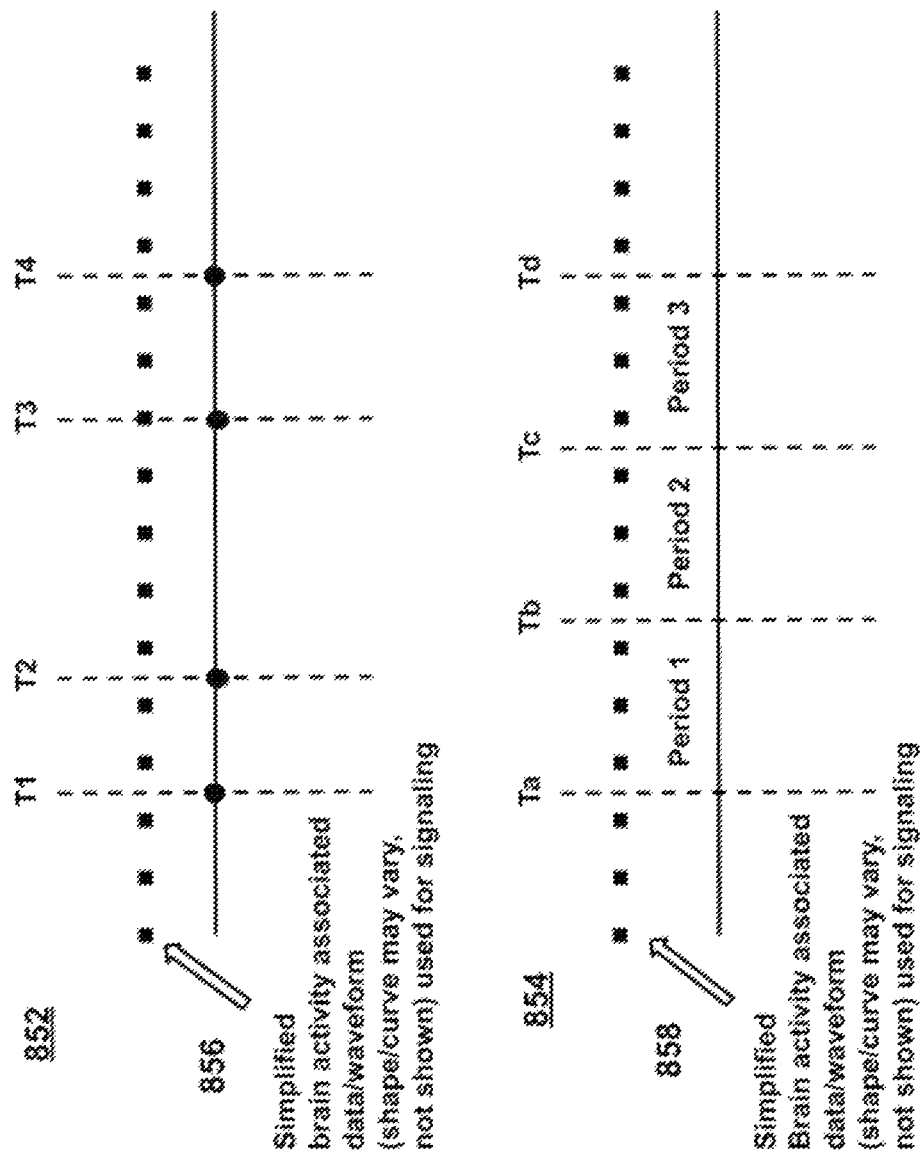

BRAIN ACTIVITY MONITORING BASED MESSAGING AND COMMAND SYSTEM

PRIORITY APPLICATIONS

This application claims priority to U.S. Provisional Application No. 63/384,360, filed Nov. 18, 2022, titled, "SCALABLE, CUSTOMIZABLE AND OPTIMIZABLE MESSAGING AND COMMAND SYSTEM BASED ON BRAIN ACTIVITY MONITORING" and U.S. Provisional Application No. 63/385,397, filed Nov. 29, 2022, titled, "SCALABLE, CUSTOMIZABLE AND OPTIMIZABLE MESSAGING AND COMMAND SYSTEM BASED ON BRAIN ACTIVITY MONITORING".

BACKGROUND

Technologies, such as brain computer interface (BCI), may, for example, be directed to providing a direct communication pathway between the human brain (e.g., brain electrical activity) and a device. BCI implementations may use, e.g., non-invasive, partially invasive and invasive implementations.

BCI is sometimes considered to have begun with the work of Jacques Vidal in the 1970s, including work directed to use of EEG signals (a non-invasive implementation) in control of movement of a cursor-like visual object on a computer screen. More recent and continuing BCI work has included invasive implementations, such as may include, e.g., surgical implantation of a device into the skull of a user to detect and interpret brain electrical activity.

To date, however, BCI and other technologies have continued to experience substantial challenges and limitations.

SUMMARY

Some examples provide a brain activity monitoring based message and/or command (BAM) system, apparatus, device, method or computer readable media for implementing a method, such as may be considered to be associated with BCI, in that which is thought in the specific thinking during the brain activity monitoring is not required to be related to the message or the command.

One example provides a system comprising: a brain activity monitoring device or system configured to obtain data relating to at least one parameter relating to brain activity of a user; and at least one computer or computerized system, communicatively coupled with the brain activity monitoring device or system, comprising at least one processor and at least one memory, the at least one processor being configured to: based at least in part on at least a portion of the obtained data, obtain from the user two or more signals, wherein each of the two or more signals is generated by the user at least in part by the user engaging in specific thinking to cause one or more values of one or more parameters relating to the brain activity of the user to meet one or more specified conditions, wherein the one or more parameters are associated with the at least one parameter; determine two or more data values, wherein each data value of the two or more data values corresponds with a signal of the two or more signals; based at least in part on at least two of the two or more data values, determine a set of at least two data values; based at least in part on the set of at least two data values, determine a message for presentation or a command for implementation, on at least one system or device; and determine output at least in part for causing presentation of the message or implementation of the command on the at least one system or device; wherein that which is thought in the specific thinking is not required to be related to the message or the command.

In various embodiments, the at least one processor may be configured to obtain the two or more signals in various ways. In some embodiments, obtaining the two or more signals may include use of one or more signal associated algorithms (SAA(s)). The SAAs may determine the two or more signals based at least in part on the one or more specified conditions. For example, the SAAs may include logic to determine whether one or more data values of one or more parameters relating to the brain activity of the user (e.g, signal related parameter data values or SRPDVs) satisfy the one or more specified conditions, which may result in a signal being obtained, which may include being determined or identified. The SAAs may include logic associated with the one or more conditions—e.g., logic specifying multiple conditions that must be met, or one or several of multiple conditions that must be met, for a signal to be obtained. The SAAs may also include or may access data values with specifics related to the one or more conditions (e.g., threshold values, value ranges, or more complex functions that may be associated with, e.g., waveform features, etc.). The SAAs may apply the condition(s), in accordance with logic, to determine whether a signal is obtained, which may include comparing SRPDVs to the conditions, e.g., by comparison with condition related data values, or by use of function(s). The determination may result in output that may reflect the determination, which may be part of obtaining signals. The SAAs may include use of mathematical models, statistical analysis, artificial intelligence or neural networks in obtaining signals.

Furthermore, in some embodiments, SAAs may include various algorithms for various functions associated with obtaining signals, which may be called subalgorithms. For example, in some embodiments, filtering subalgorithms may be used in selecting or filtering data obtained from the brain activity monitoring, such as to obtain the SRPDVs, such as for signal generation or determination optimization. Comparison subalgorithms may be used in, e.g., applying the conditions in association with obtaining signals, and output from the filtering subalgorithms may be used as input to the comparison subalgorithms. Furthermore, in some embodiments, condition determination subalgorithms may be used in determining the conditions themselves or logic to be applied thereto, such as may include factors such as signal optimization, signal generation efficiency, calibration, etc. In some embodiments, however, user input may be used, or may also be used, in determining conditions.

Still further, in some embodiments, in obtaining the one or more signals, optimization subalgorithms may be used. For example, in some embodiments, during use of the system, data generated by or used by the system may be used as input to the optimization subalgorithms. The subalgorithms may filter, calibrate or modify data associated with or used as SRPDVs, conditions, or logic to be applied to conditions. For example, monitored system data may allow continuous calibration of obtained brain activity monitoring data, such as to increase accuracy thereof, or may modify conditions or logic to improve accuracy or efficiency of signal generation or of obtaining signals. In some embodiments, algorithm selection subalgorithms may be used in, e.g., selecting, identifying or determining one or more other algorithms or subalgorithms used in obtaining signals.

In some examples, the output comprises at least one data signal. In some examples, the system is configured to send the at least one data signal to the at least one system or device for, at least in part, causing the presentation of the message or implementation of the command. In some examples, the system comprises at least one controller, wherein the at least one controller comprises the at least one processor and the at least one memory. In some examples, the at least one computer or computerized system is at least one of: at least in part physically integrated with the brain activity monitoring device or system, physically separate from at least a portion of the brain activity monitoring device or system, at least in part physically integrated with the at least one system or device, and physically separate from at least a portion of the at least one system or device. In some examples, the message or the command corresponds with the set of at least two data values. In some examples, the at least one processor is configured to: obtain the two or more signals, wherein the two or more signals are generated by the user for causing the message to be presented or the command to be implemented on the at least one system or device. In some examples, the set of at least two data values at least one of: includes only data values that correspond with signals of the two or more signals, includes at least one data value that does not correspond with a signal of the two or more signals, and includes no data value that corresponds with a signal of the two or more signals. In some examples, the set of at least two data values comprises a sequence of at least two data values, and each data value of the set of at least two data values is capable of having one of at least two values.

In some examples, the brain activity monitoring device or system comprises utilizes at least one of: invasive brain activity monitoring, non-invasive brain activity monitoring, partially invasive brain activity monitoring, electroencephalography (EEG), EEG with electrodes placed on the surface of the scalp, EEG with electrodes placed under the skin, intracranial EEG (iEEG), subdural EEG, depth EEG, a microelectrode array, electrocorticography (ECoG), magnetoencephalography (MEG), electrooculography (EOG), magnetic resonance imaging (MRI), tomography, imaging, spectrography, positron emission tomography (PET), functional magnetic resonance imaging (fMRI), functional ultrasound imaging (fUS), and single photon emission computed tomography (SPECT). In some examples, the at least one processor is configured to use at least one artificial intelligence algorithm in at least one of: obtaining the two or more signals from the user, determining the one or more parameters, determining the one or more values of one or more parameters, determining the one or more specified conditions, determining the two or more data values, determining the set of at least two data values, identifying the message or the command, identifying the at least one system or device, communicating with the brain activity monitoring device or system, communicating with the at least one system or device, and determining the specific thinking prior to the user engaging in the specific thinking to cause the one or more values of the one or more parameters relating to the brain activity of the user to meet the one or more specified conditions. In some examples, the at least one parameter relating to the brain activity of the user relates to at least one of: electrical activity, electromagnetic activity, magnetic activity, chemical activity, oxygen usage, electrochemical activity, and blood flow.

In some examples, the at least one processor is configured to: obtain from the user the two or more signals, wherein each of the two or more signals is generated by the user only by the user engaging in the specific thinking. In some examples, the at least one processor is configured to: obtain from the user the two or more signals, wherein at least one of the two or more signals is generated based in part on physical movement of the user. In some examples, the at least one processor is configured to: obtain the two or more signals, wherein that which is thought in the specific thinking comprises at least one of: a specific concept or a specific mental activity. In some examples, the at least one processor is configured to: obtain the two or more signals, wherein the specific thinking is determined prior to the user engaging in the specific thinking to cause the one or more values of the one or more parameters relating to the brain activity of the user to meet the one or more specified conditions. In some examples the at least one processor is configured to: obtain the two or more signals at least in part to optimize signal generation. In some examples, the one or more parameters at least one of: make up the at least one parameter, and are determined based at least in part on the at least one parameter.

One example provides a system comprising: a brain activity monitoring device or system configured to obtain data relating to at least one parameter relating to brain activity of a user; and at least one computer or computerized system, communicatively coupled with the brain activity monitoring device or system, comprising at least one processor and at least one memory, the at least one processor being configured to: based at least in part on at least a portion of the obtained data, obtain from the user a set of two or more signals, each of which is generated by the user at least in part by the user engaging in specific thinking to cause one or more values of one or more parameters relating to the brain activity of the user to meet one or more specified conditions, wherein the one or more parameters are associated with the at least one parameter; determine a set of at least two data values, wherein each data value of the set of at least two data values corresponds with a signal of the set of two or more signals; determine a message for presentation or a command for implementation, on at least one system or device, that corresponds with the set of at least two data values; and determine output at least in part for causing presentation of the message or implementation of the command on the at least one system or device; wherein that which is thought in the specific thinking is not required to be related to the message or the command. In some examples, the set of at least two data values comprises a sequence of at least two data values.

One example provides a system comprising: at least one computer or computerized system, comprising at least one processor and at least one memory, the at least one processor being configured to: receive data relating to at least one parameter relating to monitored brain activity of a user; based at least in part on at least a portion of the received data, obtain from the user two or more signals, wherein each of the two or more signals is generated by the user at least in part by the user engaging in specific thinking to cause one or more values of one or more parameters relating to the brain activity of the user to meet one or more specified conditions, wherein the one or more parameters are associated with the at least one parameter; determine two or more data values, wherein each data value of the two or more data values corresponds with a signal of the two or more signals; based at least in part on at least two of the two or more data values, determine a set of at least two data values; and based at least in part on the set of at least two data values, determine a message for presentation or a command for implementation, on at least one system or device; and determine output at least in part for causing presentation of the message or implementation of the command on the at least one system or device; wherein that which is thought in the specific thinking is not required to be related to the message or the command.

One example provides a method comprising: receiving data relating to at least one parameter relating to monitored brain activity of a user; obtaining from the user, by at least one processor of at least one computer or computerized system, the at least one computer or computerized system being communicatively coupled with the brain activity monitoring device or system, based at least in part on at least a portion of the received data, two or more signals, wherein each of the two or more signals is generated by the user at least in part by the user engaging in specific thinking to cause one or more values of one or more parameters relating to the brain activity of the user to meet one or more specified conditions, wherein the one or more parameters are associated with the at least one parameter; determining, by the at least one processor, two or more data values, wherein each data value of the two or more data values corresponds with a signal of the two or more signals; determining, by the at least one processor, based at least in part on at least two of the two or more data values, a set of at least two data values; determining, by the at least one processor, based at least in part on the set of at least two data values, a message for presentation or a command for implementation, on at least one system or device; and determining, by the at least one processor, output at least in part for causing presentation of the message or implementation of the command on at the least one system or device; wherein that which is thought in the specific thinking is not required to be related to the message or the command. In some examples, the set of at least two data values comprises a sequence of at least two data values.

BRIEF DESCRIPTION OF THE DRAWINGS

Various aspects of embodiments of the present disclosure are discussed below with reference to the accompanying figures, which are not intended to be drawn to scale. The figures are included for illustrative purposes and a further understanding of the various aspects and examples. The figures are incorporated in and constitute a part of this specification, but are not intended to limit the scope of the disclosure.

FIGS. 1, 1A and 1B are block diagrams illustrating example brain activity monitoring based message and/or command (BAM) systems.

FIGS. 6-8A illustrate simplified example waveforms representing examples of parameter tracking data, and associated features, including signaling thresholds and ranges, which may be used in a BAM system.

DETAILED DESCRIPTION

Figure 2:
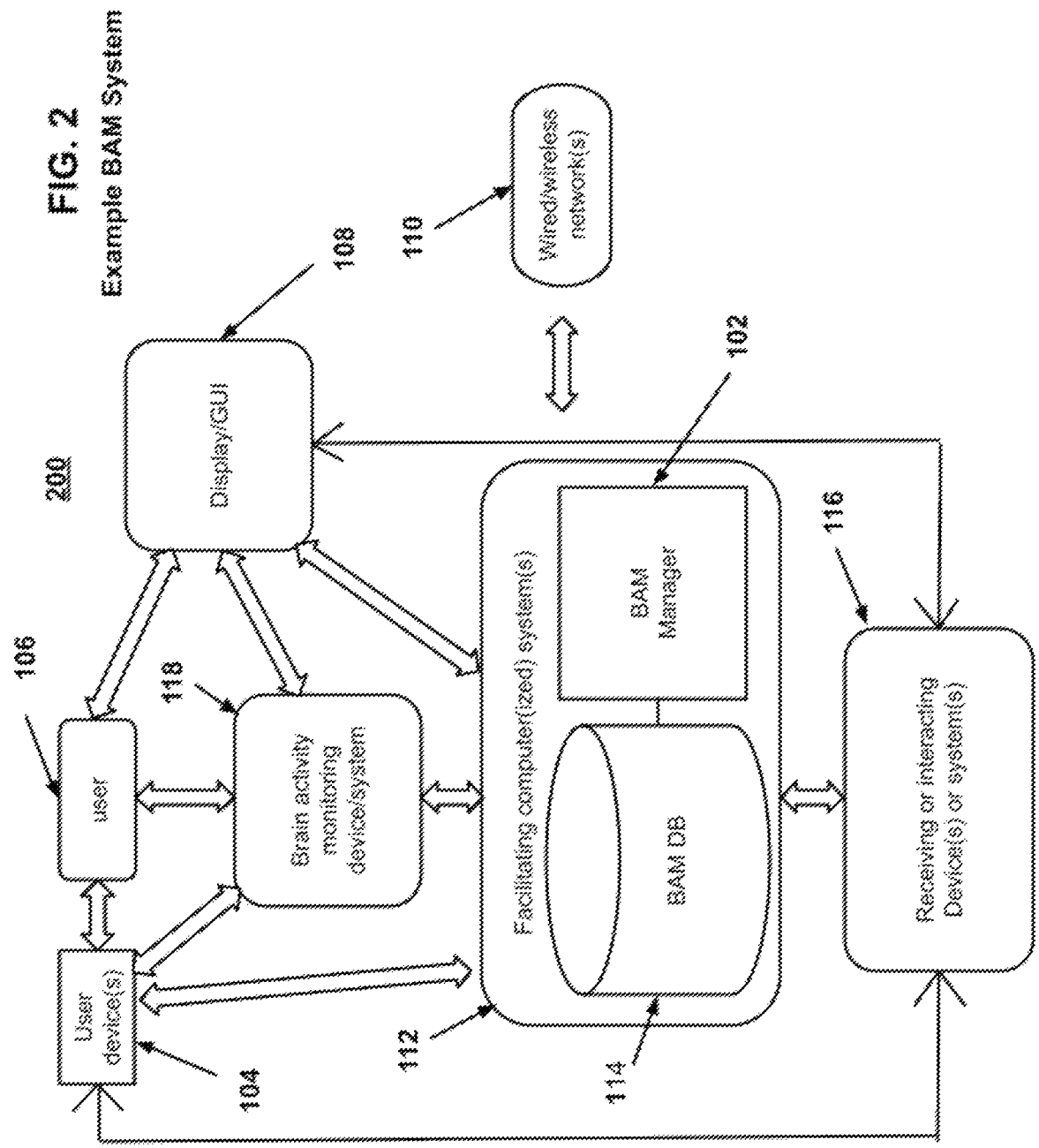
FIG. 2 is a block diagram illustrating an example BAM system, including a BAM database including bit group or sequence to message or command correspondence data, in accordance with some embodiments of the invention.

Some embodiments provide methods, systems, apparatuses and computer readable media, which may be considered to be associated with BCI, and which may include using monitored brain activity of a user in determining a message for presentation, or a command for implementation, on one or more devices. A brain activity monitoring system (e.g., an electroencephalogram (EEG) system including an EEG headset) may obtain data related to at least one parameter relating to brain activity of the user (e.g., EEG data). A computer or computerized system (which may, e.g., be combined with the brain activity monitoring system) may obtain two or more signals from the user (or, in some embodiments, one or more signals). The signals may be generated by the user using specific/particular thinking to cause a first one or more parameters of relating to the monitored brain activity of the user (e.g., an amplitude parameter) to meet one or more specified conditions (e.g., the amplitude parameter being above or below a specified threshold). The computer or computerized system may determine data values corresponding with each of the two or more signals (e.g., a signal may have a value of "0" if the amplitude parameter is below the threshold, or a value of "1" if the amplitude parameter is above the threshold), and determine an associated set or sequence, of data values (e.g, sequence of data values of 1, 0 and 1 may be used in forming the set or sequence (1, 0, 1).

In some embodiments, based at least in part on the set or sequence of data values, the computer or computerized system may determine a message for presentation, or a command for implementation, on at least one device. For example, the sequence (1, 0, 1) may be determined to correspond to the message, "Hello world!" for presentation as a textual message on a display of a computer or smartphone, or may correspond to a command to cause a wheelchair to turn right or to cause a character on a video game on a computer to run forward in the video game. In some embodiments, the user may set specific sequences to correspond with specific messages or commands, such as for specific applications, and may then use the specific sequences to send the corresponding messages or implement the corresponding commands.

In some embodiments, the specific thinking used by the user may not be required to be related to the message or command. For example, the specific thinking may be determined at least in part based on optimizing signal generation. For example, certain specific thinking can cause immediate detectable changes to EEG waveform parameters (e.g., thinking of a closed first can cause an immediate, detectable reduction/attenuation in amplitude in an EEG mu wave waveform). This may be used in signal generation (e.g., a specific time, if the amplitude is above a threshold, then a signal is sent that is associated with the value of "1", and if the amplitude is below the threshold, then a signal is sent that is associated with a value of "0"). However, in various embodiments, various types of brain activity monitoring, parameters and signal generation criteria may be used, including use of a signal with more than two potential values. Using such signaling, a user may, for example, quickly send a sequence of signals (e.g., (1, 0, 1) in the example above) in order to, e.g., send a desired message or cause implementation of a desired command on a device. In this way, even, e.g., a sequence of few data values can be used to generate any of a very large number of messages or commands (e.g., a sequence of 3 binary data values allows generation of any of 2 to the power of 3, or 8, messages or commands, and a sequence of 5 allows generation of 2 to the power of 5, or 32, massages or commands—and with ternary (3 or more possible values) or greater types of data, even greater numbers of messages or commands can be generated for a set or sequence of a given number of data value.

In some embodiments, specific thinking only, without any physical movement, is used in generating signals, or one or more signals of a set. However, in some embodiments, a combination of specific thinking and physical movement may be used, and, in some embodiments, physical movement only may be used in generating signals, or one or more signals of a set. Furthermore, in various embodiments, various types of brain activity monitoring may be used, which may include, e.g., non-invasive, partially invasive, or invasive types of monitoring, and which may relate to, e.g., electrical activity, chemical activity, oxygen usage or blood flow.

In some embodiments, systems and methods include aspects related to increasing accuracy of signaling, or reducing accidental or misinterpreted signaling. Such accuracy and error prevention can be especially important in applications in which an accidental signal could generate an accidental message or command that could have serious negative consequences (e.g., turning a wheelchair, or a car, when not intended, for example). Such embodiments can include, e.g., requiring multiple simultaneous conditions for the sending of a particular signal.

In some embodiments, a signal may be generated, such in immediately, based on a single parameter (e.g, a morphological characteristic of a waveform) meeting a specified condition (e.g., amplitude being above or below a threshold at a particular time, or for a period of time, or passing the threshold from high to low, or from low to high). However, in other embodiments, other forms of signal generation are used. For example, multiple parameter related conditions, which may relate to multiple parameters, may have to be met, such as simultaneously or over the same period of time, in order to, e.g., send a signal corresponding to a specific data value (e.g., an amplitude related condition and another condition relating to another waveform morphology related parameter, such as slope, etc.). Furthermore, in some embodiments, multiple conditions may relate to a specific thinking related parameter and a physical action parameter (e.g. a waveform amplitude being above a threshold and the user pressing a button).

In some embodiments, satisfaction of a set, e.g., sequence, of signals, to lead to generation of a specific message or command, including, for example, satisfaction of a set or sequence of data values over time. For example, in the example above, the sequence (1, 0, 1) may be sent, such as in real time. However, in some embodiments, a table, data structure or array may be used, where data values may be satisfied over time. For example, at time A, a user may send the signal "1" to be added to the sequence. The data structure may be updated to include the first element of "1". At later times, the second and third data values of "0" and "1" may be added. In some embodiments, only when the third and last data value of "1" is added, is the message or command presented or implemented. In that way, a user can "set up" the first values of the sequence, but wait on sending the signal to generate the last data value, to complete the sequence and send the message or implement the command. In this way, error prevention may be increased, yet the message or command may finally be presented or implemented upon the sending of only the last signal, which may be something that can be accomplished quickly, thus optimizing speed and error prevention. As such, in some embodiments, BAM algorithm(s) may be used to track the data structure and sequence fulfillment.

Additionally, in some embodiments, for each data value of a set or sequence that corresponds to a message or command (e.g., a primary set or sequence), one or more secondary data value sets or sequences may be used to generate that data value. For example, in the example above the sequence (1, 0, 1) may correspond with the message, "Hello world!" In some embodiments, each data value in that sequence (e.g., the first data value of "1") may itself require sending/obtaining of a corresponding set or sequence of data values. For example, a secondary data value sequence of (0, 0, 1) may be required to send the first "1" of the primary sequence (1, 0, 0) (or one or more data values thereof). Such embodiments may also increase error prevention and better ensure accuracy. Additionally, in some embodiments, for each data value in a secondary data value set or sequence, one or more secondary data value sets or sequences may be used to generate that data value.

Additionally, in some embodiments, specific data values, such as in a primary data set or sequence, may have significance beyond, or serve a purpose other than, completing the set or sequence to correspond with the message or command. For example, in some embodiments, a single data value of a primary sequence may identify an application (or output device) to which the remainder of the primary data set relates. For example, in the primary data set (1, 0, 1), the final "1" could identify the application, while the first (1,0) may identify a particular message or command within that application. Additionally, in some embodiments, a set or sequence of signals may be required to be sent or fulfilled multiple times, to result in presentation or a message or implementation of a command, to reduce the possibility of accident/error. Furthermore, in some embodiments, artificial intelligence algorithm(s) or entity(s) could be used, e.g., in identifying an appropriate context (e.g., if the user is playing a particular video game, use the set of messages or commands relating to that video game).

Furthermore, in some embodiments, artificial intelligence algorithm(s) (which may include model) or entity(s) may assist in, or provide, various functions, features or roles. For example, in some embodiments, rather than (or in addition to) use of a brain activity monitoring system used by a user, an artificial intelligence algorithm(s) or entity(s) may send signals directly (or may assist a user), such as to be obtained, or by data input to data value sets or sequences, rather than by using specific thinking. In some embodiments, artificial algorithm(s) or entity(s) may be, or be included with, the device to present the message or command, and may have a role in determining specifics relating to the presentation of the message or implementation of the command, for example. Furthermore, in some embodiments, an artificial intelligence algorithm(s) or entity(s) may have, or assist in, other roles, such as of the brain activity monitoring system, the computer or computerized device, or the device for presentation of the message or implementation of the command, including in, e.g., obtaining data relating to at least one parameter of brain activity of a user, obtaining signals from a user, determining data values corresponding with signals, determining sets and sequences of data values, determining messages for presentation and commands for implementation on a device based at least in part on data values, and causing presentation of messages and implementation of commands on devices.

In some embodiments, systems and methods are provided that may provide a tool for allowing a user to create a set, or, e.g., library, of groups or, in a sense, languages or messages or commands for each of a number of applications. For example, a user may use such a tool to define a set of messages and commands, and associated sequences, for each of a set of applications (e.g., one might be a video game, another might be control of a device, etc.).

Some embodiments include a recognition that thinking produces real activity (even if not visible to the eye) and changes in the brain, including electrical, chemical, electromagnetic, and electrochemical activity and changes, and the specific thinking can measurably affect that activity or changes as reflected in brain activity monitoring data. Various embodiments may include various types of brain activity monitoring, such as may be directed to various of these measurable effects. While various embodiments described herein are not dependent on particular physiological pathways explanations, as an example, thinking may be associated with brain waves that may be associated with oscillations such as may be associated with neural firing. Furthermore, thinking can be associated with associated or synchronized activity among groups of neurons, which can lead to rhythms that are observable and measurable, for example, using brain activity monitoring techniques including EEG. These rhythms can, for example, be associated with waveforms that have various waveform characteristics, including waveform morphologies and morphological characteristics. The waveforms and their characteristics, such as amplitude or amplitude range over time, may be measurably affected by specific thinking, as may be reflected in the foregoing example of a person's mu pattern being affected by the person thinking about making a fist.

As such, brainwaves and associated waveforms and their morphologies (e.g., of various frequencies and frequency ranges) may be measurably affected by specific thinking, which is leveraged in embodiments described herein. However, in other embodiments, other changes and patterns associated with specific thinking may be monitored and leveraged, such as in signaling as described herein. For example, specific thinking may be associated with distributions and patterns associated with the degree, intensity, type or density of neural firing or activity (general or specific) within and over particular areas and volumes of the brain. In some embodiments, changes in these distributions and patterns may be leveraged in signaling. For example, in some embodiments, these distributions and patterns exhibit particular characteristics associated with specific thinking, which characteristics can be leveraged in signaling. For example, two or three dimensional distributions and patterns relating to degree, intensity, density, type or density of neural activity may exhibit measurable characteristics and parameters associated with specific thinking, including measurable changes in spatial or volumetric density, and threshold and ranges can be defined to leverage such characteristics and parameters (e.g., neural activity, or neural activity of a certain type, occurring above or below a specified threshold, or within a specified range, for some defined surface area or regional volume of the brain that may be associated with the specific thinking). Additionally, other, more complex patterns may occur, be measurable and be leveraged, such as may include mathematically definable and specifiable patterns, shapes, and distributions, for example.

Additionally, in some embodiments, changes and patterns may be specified over a specified period of time, and conditions may be specified with regard to patterns associated with conditions or changes defined or specified over time (e.g., a particular slope representing a rate of increase or decrease of neural activity or a specified type of neural activity being within a specified range for the entire specified period of time). As such, in some embodiments, a parameter may be associated in a unified way over a specified period of time (e.g., a particular characteristic being over a threshold for the entire period of time) or may be specified, such as in more complex or mathematical ways, in a non-unified way (e.g., a specified, time-based pattern created over the overall period of time). In some embodiments, machine learning or artificial intelligence techniques, including particularly specified feature sets relating to the brain, brain activity or neural activity, may be used, for example, in identification and measurement of changes and patterns associated with brain activity that may be leveraged in signaling.

In various embodiments, any of various types of monitoring and monitoring relating physical or chemical detection may be used. For example, various embodiments may use various types of detectable biosignals, including electrical biosignals and non-electrical biosignals. Further examples of detectable phenomena that various embodiments may use include radiation-based (including light and electromagnetic radiation), electricity-based, chemistry-based, physical (e.g., molecular, cellular, intracellular, or tissular) movement or shifting based, heat-based, etc.

Some embodiments provide systems, methods, apparatuses and techniques relating to using brain activity monitoring, or brain activity monitoring data, in generating messages or commands. In some embodiments, the receiving device or system may be in two-way communication with the user, such as via a device or system that the user uses to generate the messages or commands. Messages can include any of various communications, including letters, words, phrases, sentences, images, videos, media, likes, symbols, etc., and, in various embodiments, signal groups or sequences can correspond with any of them (e.g., a sequence may correspond with a word, letter, phrase, image, symbol, etc.). Commands may, e.g., be used in control, including of or associated with a device, system (which may include, e.g., a subsystem, control system, etc). Brain activity monitoring can include, e.g., invasive, partially invasive or non-invasive techniques, electroencephalography (EEG/iEEG), microelectrode array use, electrocorticography (ECoG), magnetoencephalography (MEG), electrooculography (EOG), magnetic resonance imaging (MRI), tomography, imaging, spectrography, positron emission tomography (PET), fMRI (functional magnetic resonance imaging), functional ultrasound imaging (fUS), single photon emission computed tomography (SPECT), non-invasive or invasive EEG, EEG with electrodes placed on the surface of the scalp, EEG with electrodes placed under the skin, intracranial EEG, subdural EEG or depth EEG. Some embodiments combine use of brain monitoring with other technologies or software, such as machine learning or artificial intelligence. Brain activity monitoring can include, for example, monitoring of various brain wave patterns, rhythms, or sensorimotor rhythms (SMRs), including various brainwaves, brainwaves of various amplitudes, and brainwaves of various frequencies, including, e.g., alpha waves (e.g., 8-12 Hz recorded from occipital lobes), mu waves (e.g, 7.5-12.5 Hz recorded from the motor cortex), delta waves (e.g., 0.5-5 Hz), theta waves (e.g., 4-7 Hz), beta waves (e.g., 12.5-30 Hz), sigma waves (e.g., 12-16 Hz recorded from the fronto-central head region), gamma waves (e.g., 24-140 Hz), or other high-frequency oscillations (HFOs) (e.g., greater than 30 Hz). In some embodiments, mu waves or mu rhythms are monitored.

The mu rhythm may include, e.g., frequencies of about 8-12 Hz, for example. In some embodiments, a user can cause the user's mu rhythm to vary, such as in amplitude, using just thinking, such as thinking about movement of a portion of the user's upper body, arm or hand, or making (or releasing) a fist. For example, a user may be able to, e.g., attenuate, which may be associated with neural desynchronization, or reduce the amplitude or energy of, the user's mu rhythm, by thinking of, e.g., making a fist.

It has been shown that various brainwave rhythms, including mu and beta rhythms, can be influenced by specific thinking, such as may produce measurable effects over, e.g., 300 milliseconds to several seconds. The mu rhythm is a sensorimotor (SMI) rhythm that can be associated with the part of the brain that controls voluntary movement. Mu rhythms may generally be most prominent when a person is physically at rest, and tend to be attenuated or suppressed when the person is performing physical or motor actions, or even when the person is imagining or observing physical or motor action. In some cases, a person can improve mu attenuation with practice using specific thinking. It has been shown that a person can attenuate their mu rhythm (e.g., suppress or desynchronize), such as by thinking of, e.g., making a fist. It has been shown that a person can influence their alpha or beta rhythms, such as by active mental concentration, including, e.g., solving mathematical problems.

In particular, the user may use the specific thinking to cause a monitored parameter (or multiple parameters) of the user's brain activity, or waveforms or waveform morphologies associated therewith, to meet one or more specified conditions, such as being above a threshold, below a threshold, or within a range, or do any of the foregoing for a specified period of time. The user may, for example, generate one value for a signal by causing the value of the parameter to meet the conditions, and may generate another value for the parameter by causing the value to not meet the conditions. In some embodiments, the user may generate any of more than two values for the signal, such as causing the parameter to be within any of more than two particular ranges, e.g., amplitude ranges. In various embodiments, where the brain activity monitoring data results in a waveform, any of various characteristics of the waveform may serve as a parameter that the user may cause to be above or below a threshold or within a particular range or one of several ranges, such as, e.g., amplitude, crest, trough, phase, wavelength, wave steepness, or wave period. In some embodiments, other characteristics of waveform morphologies or other patterns may be used as parameters, such as pattern features (e.g., shapes, geometrical shapes, notches, ridges, etc., as well as combinations of multiple such parameters).

In some embodiments, the user may use a display or GUI of a monitor or other device that is part of the system. In some embodiments, the user may view displayed real-time or near real-time monitoring data, which may include, e.g., algorithmically modified data, that reflects a monitored or calculated parameter and may track a monitored or calculated parameter over time. In some embodiments, the user may pre-configure aspects of the system or its operation prior to use in generating signals used in generating messages or commands (or may change them during ongoing use). For example, in some embodiments, the user may use interactive displays or GUIs in testing different rhythms, parameters, parameter ranges or specific thinking, signal types (e.g., binary or ternary), signal groups or sequence aspects (e.g. a 2, 4 or 8 sequence) such as to optimize these aspects for later signal generation in connection with message or command generation. In some embodiments, an assistant, or artificial intelligence or artificial intelligence entity based assistant, may help the user in such configuration activities.

Furthermore, in some embodiments, prior to use in generating signals used in generating messages or commands (or for modifications during ongoing use), the user may custom specify particular, e.g., sequences and the corresponding messages or commands. In some embodiments, during use, the user may view, e.g., a table of such sequences and corresponding messages or commands, and may refer to it while generating appropriate sequences using specific thinking, and may view relevant tracked parameter data during such use.

In some embodiments, the specific thinking may be determined or selected without regard to a message or command such that the specific thinking, or the content thereof (e.g., an imagined image or action) need not bear any relationship to an associated message or command or the content thereof (e.g., the content or meaning of a message or the action specified or directed by a command). In various examples, that which is thought in the specific thinking is not required to be related to the message or command, in obtaining brain activity monitoring data, in obtaining from the user the two or more signals, or in determining the meeting of the specified conditions.

In various examples, the one or more parameters used in determining whether one or more specified conditions relating to signal generation are met, e.g., may or may not include at least one parameter relating to monitored brain activity, and may or may not be based at least in part thereon. Furthermore, in some examples, the one or more parameters may be or include parameters that are determined or calculated based at least in part on, e.g., the at least one parameter relating to monitored brain activity, such as may include use of a combination of two or more parameters relating to monitored brain activity, use of an algorithm, function or mathematical expression of or including at least one parameter of monitored brain activity, or in other ways. The one or more specified conditions may be associated with, e.g., one or more criteria, meeting several criteria, meeting one or more of a larger number of criteria, thresholds, ranges, values, parameters, parameters of waveform morphological features or conditions associated therewith, algorithms, functions, mathematical expressions, conditions relating to a specific time or specific period of time or not associated with a specific time or period of time, and values or variables that may or not be related to a parameter(s). For example, the one or more specified conditions may be related to, e.g., one or several brain activity monitoring or EEG related waveform parameters, such as, e.g., amplitude, a parameter determined or calculated based on amplitude, a parameter determined or calculated based on amplitude and one or more other specified conditions, etc.

In various examples, a command may be, e.g., for control or to cause an action to be taken, and can include, e.g., an instruction, order, or direction. Implementation of a command may include, e.g., executing or causing an action, order or instruction associated with the command to be taken or occur, e.g., by sending one or more appropriate signals, internal or external, or actuation or instruction signals, such as to or within one or more devices or systems. In some examples, the command may be for command or control of a device or system external to the at least one computer or computerized system. In some examples, a command may be for command or control relating to the at least one computer or computerized system, e.g., a command to cause the at least one computer or computerized system to generate specific data, store specific data, execute one or more instructions, processing tasks or algorithms, make or cause a set, array or data structure to be formed, made up, defined, etc. In some examples, determining a message or command based on a set may include, e.g., identifying or specifying a message or command associated with, corresponding with, or mapping to a unordered, ordered or sequence of data values (e.g., 101 or 011, etc.).

Some existing technologies, including brain computer interface technologies, use brain activity monitoring (e.g., via an implanted chip) and attempt to determine the content of the thinking of the user (e.g., what the user is thinking about), which may then be used in implementation (e.g., if the user thinks of moving a prosthetic limb, the system may attempt to determine this and cause the prosthetic limb to move accordingly, of, if the user is thinking of moving a character in a video game, the system may attempt to determine this and control the computer and character in the video game accordingly. It can be exceedingly difficult, when or if even possible, to essentially "read" the mind of the user to any significant, granular or practical degree, particularly considering the vast quantity of, e.g., messages and commands that a user may wish to send, among any number of applications and contexts. Some embodiments described herein, by contract, do not require any such determinations.

In some embodiments, a user can send a small number of signals over a short period of time (e.g., seconds or less than a second, and perhaps minimizing even this short period with practice) to cause sending of practically any number of messages or commands, as customized by the user, by, e.g., storing a table(s) of sets/sequence and corresponding messages or commands (e.g., via an app or BAM interface). In various examples, a user can memorize sets/sequences and corresponding messages or commands, or can use some external reference (e.g., a GUI, card, etc.). In some embodiments, the user can use the BAM system to optimize various aspects, including finding specific thinking that works best or fastest, and potentially "tuning" and optimizing aspects of parameters (e.g., selecting frequency ranges, "shaping" or equalizing waveforms, etc.).

Furthermore, in some embodiments, non-invasive brain monitoring is used, such as via a headset that may be similar to an augmented reality headset, thus avoiding the very substantial difficulty of invasive monitoring. In some embodiments, the user can set up a library of such tables, for different applications that the user may desire to use the BAM system for (e.g., sending textual messages such as email or SMS, commands for control of a prosthetic limb or an app or game on a computer, or even a car, etc.).

As such, some embodiments provide technical solutions to problems associated with, e.g., brain computer interface, including, e.g., in conveniently enabling a user to generate and send/implement any of a large number of potentially application-specific, user-defined messages and/or commands, using a small number of signals generated using specific thinking. There may be no requirement that the specific thinking bear any relationship to any message or command, and the system may not need to determine what the user is thinking of.

Furthermore, in various embodiments, various additional features may be included, such as to increase user convenience, speed, or increase accuracy/reduce risk of error (e.g., an accidental sending of a message or a command). For example, in some embodiments, for each data value (or some of them) in a set or sequence of data values corresponding to a message or command (which may be called a primary set or sequence), a user may use a secondary set or sequence of data values to correspond with, and generate or "fill in" that data value in the primary set or sequence, such as in a data structure or array. This may happen, e.g., over a period of time and not necessarily immediately. Once the array is complete, the corresponding message or command may be, e.g., presented or implemented. Additionally, in some embodiments, particular data values in a primary set or sequence may have particular meaning or features. For example, one or more of the data values may, e.g., identify the application or context, such that the determined message or command is associated with that application, e.g., by the remaining data values in the primary set or sequence. In some embodiments, an artificial intelligence algorithm or entity may assist, such as by determining the appropriate application based on the context, and potentially providing the appropriate one or more of the data values.

Herein, parameters may or may not include values associated therewith. Herein, parameters relating to brain activity may include, e.g., sensed, measured or detected parameters; parameters determined based on, or based in part on, sensed, measured or detected parameters; parameters determined based on one or more other parameters relating to brain activity; among other things. Herein, parameters relating to brain activity may also include, e.g., parameters determined by analysis, synthesis, modification, or optimization of data obtained, at least in part, by a brain activity monitoring system. Herein, parameters relating to brain activity may also include, e.g., parameters determined by analysis, synthesis, modification, or optimization of parameters. Herein, parameters relating to brain activity may also include, e.g., parameters determined algorithmically. Herein, a processor may be or be part of a controller.

Herein, specific thinking may include, e.g., a specific mental activity or thinking of a specific concept. Various examples of a specific concept may include, e.g., a concept of a car, a concept of a specific car, a concept of a specific car driving on a highway, a concept of a specific car driving on a specific highway, a concept of a number, a concept of specific number, a concept of mathematics, a concept of calculus, a concept of a specific type of math (e.g., calculus or algebra), or a concept of a specific algebraic formula. Various examples of a specific mental activity may include, e.g., control of physical action, control of specific physical action (e.g., clenching one's fists, clenching one's right fist, slowing of heartbeat (or "calming down" to lower heartbeat)), cognition, a specific cognitive activity (e.g., creativity, mathematical analysis, meditation, emotional control, memorization, memory recall, or concentration), a specific application of a cognitive ability (e.g., "calming down" to dispel anger, thinking of a spider to create fear, concentrating on listening, or recalling specific memories). Herein, determining specific thinking may include determining that which is to be thought in the specific thinking.

FIG. 1 is a block diagram illustrating an example brain activity monitoring based messaging or command (BAM)

system 100. The system 100 includes a brain activity monitoring device/system 154, computer(s) or computerized system 168, monitor/presentation device/system 160, and a device/system for implementing command(s) or presenting message(s) 164. In various embodiments, however, one or more of components 154, 168, 160, 164 of the system 100 may be omitted or combined. Additionally, in various embodiments, one or more of the components 154, 168, 160, 164 may be capable of wired or wireless connection to one or more other of the components 154, 168, 160, 164, such as may include Internet and/or one or more local or wide area network connections (which may include one or more secure or authenticated connections), may be configured for wired or wireless connection, may include communication interfaces, may include or be coupled with one or more of a wireless receiver, transmitter or transceiver, and may be local or remote from each other. For example, the brain activity monitoring device/system 154 may be combined with one or more of components 168, 160 and 164. Furthermore, in some embodiments, the computer(s) or computerized system 168 may be combined with one or more of components 154, 160 and 164. Furthermore, in some embodiments, the monitor/presentation device/system 160 may not be included, or may be combined with one or more of components 154, 168 or 164. Still further, in some embodiments, the device/system for implementing command(s) or presenting message(s) 164 may not be included as part of the system 100, or may be combined with one or more of components 154, 168 and 160.

The brain activity monitoring device/system 154 may include, e.g., an EEG device/system, which may include a headset that may include or be coupled with one or more scalp electrodes 156. The EEG headset may be worn by a user 158. The device/system 164 may be or include, e.g., a computer, computerized device/system, robotic device/system, machine, or other type of device/system or entity capable of implementing command(s) and/or presenting message(s). The monitor/presentation device/system 160 may include one or more display(s)/graphical user interfaces (GUIs) 162 (which may provide presentations including, e.g., visual displays, audio, tactile presentations, or others).

The computer(s) or computerized system 168 may include, e.g., a CPU 170 and a data storage device 172, may include various other components, including, e.g., one or more controllers, and may include, e.g., one or more local devices or systems and/or one or more remote devices or systems, which may be coupled to each other by wired or wireless connection and communication interfaces. The data storage device 172 may include a BAM manager 152, which may represent any or all software (including, e.g., programming and applications) used in implementing various embodiments. In some embodiments, one or more of the devices of the system may include one or more controllers or microcontrollers, comprising a processor and a memory, which may, e.g., be used in interface or communications between devices.

FIG. 1A is a block diagram illustrating another example BAM system 180 (or device). The system 180 includes a brain activity monitoring device/system 182 including a wireless transceiver 189. The system 180 further includes a computer(s) or computerized system(s) 184 including a CPU 185, a data storage device 186 including a BAM manager 187, and a wireless transceiver 191. The system 180 further includes a device/system for implementing command(s) or presenting message(s) 188, including a wireless transceiver 190. A user 183 is also shown. Unlike the example system 100 of FIG. 1, the system 180 of FIG. 1A does not necessarily include, e.g., a separate monitor/presentation device/system. In some embodiments, the brain activity monitoring device/system 182 may be connected with or part of a headset (or, e.g, cap) worn by the user, which, in some embodiments, may include a display or other presentation component (e.g., a speaker or tactile component). In some embodiments, however, a brain activity monitoring system may not be included, and, e.g., a BAM manager of a computer(s) or computerized system(s) may obtain data, such as data relating to at least one parameter of brain activity of a person or user of a brain activity monitoring system (or device), such as, e.g, directly from a brain activity monitoring system (or device) or via one or more intermediary systems or devices, or elsewhere.

FIG. 1B is a block diagram illustrating another example BAM system 2000, in accordance with some embodiments of the invention. The system 2000 includes one or more brain monitoring device(s)/system(s)/computer or computerized system 2020 (which may include brain activity monitoring), may include a CPU 2022, data storage device 2002 including a BAM manager 2004, and a wireless transceiver 2006. The system 2000 further includes device(s)/system(s) for implementing command(s) and/or presenting message(s) 2010, which includes a CPU 2012, a data storage device or memory 2014 including a BAM manager 2016, and a wireless transceiver 2018. A user 2008 is also shown.

Unlike the example system 180 of FIG. 1A, the system 2000 of FIG. 1B does not necessarily include, e.g., a separate computer(s) or brain activity monitoring system and the computer(s) or computerized system(s) may be integrated (or, in some embodiments, partially integrated), which can include physical integration and/or software and operational integration. In various embodiments, the BAM managers 2004, 2016 may, e.g., communicate and operate in an integrated fashion, may be distributed components of a single BAM manager, or only one of the components 2020, 2010 may include a BAM manager.

In some embodiments, a BAM system may include a brain activity monitoring device (e.g., an item(s) attachable or wearable at least in part on the user's head, a headset which may be incorporated into a hat, cap, or other wearable item) without any additional local device or device physically proximate to the user. In other embodiments, a display (or other presentation device such as speaker, etc.), or a computerized display may be carried with or worn by the user, or may be integrated with the brain activity monitoring device or system, e.g., a virtual reality or enhanced reality headset including a visual display may be also worn or integrated with the brain activity monitoring device or system. In various embodiments, for example, a BAM system may include just a headset, or a headset and a handheld device (e.g, dedicated device, smartphone, tablet, etc.), or other device (e.g. notebook or desktop computer) as well as (or integrated with or partially integrated with) the computer(s) or computerized system)(s).

In some embodiments, the computer or computerized system (or, e.g., a combined brain activity monitoring system and computer or computerized system) may send (e.g., transmit, by wire or wirelessly) at least one data signal (e.g., one or more digital signals) to a system or device to cause presentation of the message or implementation of the command, such as, as in FIGS. 1, 1A and 1B, conceptually represented data signals 174, 193 and 2024. For example, the data signal(s) 174, 193, and 2024 may be generated so as to be associated with or correspond with the message or the command. For example, data of, carried by or represented by the data signals 174, 193 and 2024 may include data representing, is associated with, corresponds with, specifies, or identifies the message or the command. In some embodiments, for example, the system or device may be configured (e.g., via software, application(s) and/or hardware thereof) to receive and recognize or identify the data signal(s) 174, 193, 2024 such that the appropriate message can be presented or command can be, e.g., identified or selected and implemented. In some embodiments, the system or device may also send communications back to the computer(s) or computerized system(s) (which may be part of, e.g., a combined brain activity monitoring system and computer(s) or computerized system(s)). In some embodiments, however, the computer or computerized system may output or output and send, internally or externally a data signal(s) or data, such as may be stored internally or externally, which may or may not be used to cause presentation of a message or implementation of a command, or which may not be associated with a message or a command.

Furthermore, in some embodiments, a portion of the data signal(s) 174, 193, 2024 may include, or include representation of, what might be called metadata (or metadata may be communicated at least in part separately or at a different time). For example, the metadata may include historical or collected data associated with the message or command or generation thereof. This may include, for example, stored data relating to, e.g., the particular thinking used by the user in generating the associated signals, data values or a data set used, etc. Furthermore, in some embodiments, the system (the computer(s) or computerized system(s)) may be configured to store such metadata for later use to be included or represented in data signaling. Furthermore, in some embodiments, the device or system (which, in various embodiments, may or may not be included within an overall BAM system) may store metadata, or communicate it to, e.g., the computer or computerized system. In some embodiments, metadata may be stored and aggregated, such as for later use, e.g., in optimization of aspects of operation of a BAM system, which may, e.g., include use of artificial intelligence (e.g, one or more artificial intelligence algorithms or models, neural networks, etc.).

Furthermore, in some embodiments one or more artificial intelligence, neural network or artificial neural networks, or associated algorithms, models or entities, which may or may not be part of a BAM program(s), may be used in accomplishing, facilitating, or assisting with various steps, functions or determination that may be performed or accomplished by a brain activity monitoring system and/or a computer(s) or computerized system(s). Furthermore, features/feature sets and classifiers, among other things, may be developed, determined and/or utilized specifically in accordance with, or customized to aspects of, systems and methods described herein, such as in connection with input (e.g., to a computer(s) or computerized system), such as brain activity related parameters, thresholds, conditions, etc.

In some embodiments, details relating to presentation of a message or a command to be implemented by the receiving system or device (e.g., the color or font of message to be displayed, or the precise robotics movements corresponding to a command to a robot to pick up a cup, for example).

For example, in some embodiments, after any set up if any set up is required (whether or not a display device is included or used), a user may, such as for a particular application, memorize signals (e.g., individual signals, groups of signals, sequences of signals or shortcut signal groups, as described herein) corresponding or mapped to particular messages or commands that the user may wish to send or implement for that application. Furthermore, whether using practice or otherwise, the user may be able to sufficiently accurately and quickly generate signals without reference to any display, form of assistance, etc.

As such, some embodiments allow the user to message or command a receiving device or system, which may or may not be physically proximate to the user, using no physically proximate equipment or device other than the brain activity monitoring device or system, or with limited, portable, or worn equipment only. In some embodiments, this may allow the user great freedom to message or command a device or system that the user wishes to use or interact with, while carrying or wearing potentially only, e.g., a cap or headworn device.

In some embodiments, this can provide for incredible and liberating capabilities. For example, a user could communicate, or, e.g, operate a vehicle, even potentially while physically in or on the vehicle, wearing only a cap (e.g., with a brain activity monitoring device or system) or headworn device, such as using sufficient memorized signals, or signal groups or sequences (or shortcuts), and mapped messages or commands (or operate a remote controlled device, paint a painting, communicate while mobile, etc). Countless other applications are possible, allowing the user to message or command, with limited, carryable, portable or wearable equipment, with limited or no physical movement required for the messaging or commanding, even including applications in which the user is moving, mobile or being transported.

In some embodiments, particular applications may come with pre-configured aspects, such as pre-configured or suggested signal(s) to messages or commands mapping, shortcuts, etc., whether such pre-configurations are provided by a BAM system or hardware or software provided with the application itself. Furthermore, some embodiments software based provide applications for use with a BAM system, such as may be tailored to a particular use (e.g., messaging, communicating with and/or commanding a particular device or type of device and/or for a particular reason or activity). In some embodiments, such applications may be included with or be executed on a receiving device or system, or elsewhere, such as using a wireless or cloud based implementation. Furthermore, some embodiments provide receiving devices and systems, which may, e.g. include BAM related application(s) or software, or be capable of interacting with a BAM system, such as via appropriate software or one or more APIs, whether provided on the device or system or elsewhere.

Furthermore, in some embodiments, the user may use a BAM system, receiving device or system, or application software, to set up, practice or optimize, e.g., signal generation. For example, in some embodiments, a user may use specific thinking (as a simple example, thinking of image or action 1 (e.g., making a fist, thinking of an image of a tree, etc.), image or action 2, image or action 3, etc., or for particular periods of time (e.g., seconds) and observe the effectiveness of the particular strategy in signal generation and achieving accurate or fast messaging or command results. For example, the user may be able to practice controlling a remote controlled toy (or could practice controlling an actual remote controlled vehicle) or, if a display is used, could practice using a visual display showing or simulating what the results would be, even without being shown anything directly relating to brain activity monitoring data, using different strategies, and observe the results, and select or optimize accordingly.

In some embodiments, a BAM system may automatically or be pre-set to initially utilize particular settings (e.g, amplitude thresholds) without needing to present this data to the user. The system may, e.g., include software to allow the user to, or to automatically, adjust parameters, allowing the user to test, experiment and optimize (e.g., increase or decrease a threshold, and if it works better, change to that or try further increasing or decreasing it, etc.).

Furthermore, in some embodiments, electronic information relating to brain activity monitoring, signal processing, parameter definition, parameter data, etc., may be tailored, modified or adjusted, such as for practicality or optimization of one or more parameters of operation of the system. For example, in embodiments in which waveforms are generated based an monitored brain activity, and in which features of a waveform may be used in signaling (e.g., amplitude thresholds, notch parameters, etc., some examples of which are shown in later figures), the data may be generated or modified (or modified data be generated) to allow or optimize detection of the relevant thresholds, features, etc. For example, aspects or electronic aspects such as amplitude or gain may be adjusted for such, such as automatically via optimization software and/or by the user, with or without use of particular software. In some embodiments, such adjustments may be automatically and algorithmically made, or may be available for adjustment to the user, such as relating to or while the user is testing, experimenting with, or during use of the BAM system for messaging or commanding. For example, software may be used to adjust parameters, e.g., signal processing parameters, automatically to increase accuracy or speed of signaling, such as using feedback or signaling from the user, or the user may be provided with controls to do so (e.g, physical or virtual knobs or sliders on a device, headset, etc.).

Generally, in some embodiments, data or output from the brain activity monitoring device, or data derived from that data, may be tailored or modified, to produce tailored or modified data, such as to improve detectability of signaling, or to optimize use in signaling (e.g., improve reliability, accuracy or speed of signaling), or signal processing, where the signaling may be based at least in part on the tailored or modified data. In some embodiments, software is included for this in a BAM system. Furthermore, in some embodiments, a user may interact with the BAM system to make selections or participate in such modification or optimization, or the modification or optimization may be at least in part based on software or algorithms to automatically do so. This could include, for example, taking into account signaling aspects (e.g., accuracy, reliability or speed), generating a small modification, whether algorithmically determined or random, receiving data indicating how the modified data performed in terms of signaling aspects, or signal processing, and using the modified data if the signaling was improved, etc. It could include, e.g., modifying signal processing related aspects such as gain or amplification.

In some embodiments, a BAM system may obtain or determine signaling, e.g., from a user based on sets of conditions(s) relating to biosignal related data, and may, e.g., output and send/transmit messages or commands. However, in some embodiments, messages or commands may be generated but not sent/transmitted, or not immediately transmitted, but, e.g., may be stored in one or more databases, such as for later use, analysis (examples of which are described herein, including in relation to multiple users), mining, studies, etc. However, more generally, a BAM system may obtain or determine such signaling, and generate output signal(s) or data. In some embodiments, this output signal(s) or data could be in any of various form(s)—e.g., electrical or other such as physical, mechanical, chemical, etc. Fundamentally, a BAM system may obtain or determine signaling, e.g., from a user using specific thinking, and output signal(s) or data based at least in part on the obtained or determined signaling. In some embodiments, this output signal(s) or data could be many different things, including things other than messages or commands, whether or not sent/transmitted, such as may include any of various types of data, and for any of various types of uses. For example, in some embodiments, the output signal(s) or data may be stored in one or more databases for any of various uses, whether present or future. For example, in some embodiments, the output signal(s) or data (whether messages or commands, or something other than that) may be stored in one or more databases along with metadata associated with the output signal(s) or data, such as, e.g., data relating to a user who may have sent the associated obtained or determined signaling, data relating to the biosignal data or biosignal related data associated with the signaling, data relating to the associated set(s) of condition(s), data relating to specific thinking used in user signaling, data about any associated message or command, other data relating to, e.g. the time or other conditions or environmental conditions associated with the time or other circumstances of the, e.g., user signaling, the result of a message or command, the receiving device or system, etc.

As described further herein, FIGS. 6-8 provide examples of patterns and waveforms, or data associated with the illustrated patterns and waveform morphologies, that may represent brain activity monitoring data or be based on brain activity monitoring data, including example features that may be used in signaling. In some embodiments, these patterns or waveforms, or the data associated with them, or associated signal processing aspects or parameters, may be modified to improve associated signaling, as previously described, or the patterns or waveforms may represent already modified data sets. For example, initial data may be compressed vertically or horizontally, or modified in more complex ways. Additionally, in some embodiments, a brain activity monitoring device itself, or software thereof, may be modifiable or tunable with regard to its output. As such, in some embodiments, the electronic aspects or data aspects of the system, brain activity monitoring data, or data based on brain activity data, which may be used in signaling, may be "tunable" to improve or optimize signaling.

In some embodiments, as exemplified in FIGS. 6-8, brain activity monitoring (e.g., EEG) may include, e.g., an array of sensors, such as electrodes, such as placed on the scalp (or could include partially invasive or invasive/implanted/intracranial sensing, etc.). For example, an array of electrodes may be placed apart on different locations of the user's scalp. Such an array could be used to detect brain activity in different portions of the brain, for different frequency ranges or other parameters, etc. For example, an array of sensors could concurrently or simultaneously output a stream of data from each sensor, where each stream could be, e.g., used to generate a time-varying waveform or pattern, where each waveform or pattern might have different metadata, e.g., be associated with brain activity in a different portion of the user's brain, etc. Additionally, multiple types of sensors could be used, etc. In some embodiments, a CPU is used to process or perform signal processing on these potentially multiple streams of data. The streams could be used (or merged, etc.) in generating data (or the unmodified output brain activity monitoring data could be used), or generated display data, such as a generated pattern or waveform) with various parameters, which may vary over time and identifiable features, or features over particular periods of time (e.g., amplitude below or above a threshold or within a range, notches, slopes). The parameters (e.g., features) of the generated (or output) pattern or waveform could be used in signaling, as described herein. Furthermore, in some embodiments, specific thinking might produce more direct related brain activity (e.g., thinking of an image of an elephant might produce brain activity associated with an image of an elephant) or less direct related brain activity (e.g., thinking of an elephant may produce brain activity associated with an emotion, such as fear, that the user may experience when thinking of an image of an elephant), which might lead to multiple sensor outputs reflecting the specific thinking, or reflecting a set of conditions associated with the specific thinking.

In some embodiments, a BAM system may use user input, and/or one or more algorithms or applications in configuring and optimizing the system, including identifying the parameters in the data (e.g, output brain activity monitoring data or generated data derived therefore) that can be generated by specific thinking, so that the identified parameters can be used in signaling. Generally, in some embodiments, a BAM system may utilize optimization, determination and selection of particular derived data (e.g., particular combinations or functions of output data), optimization of signal processing on the derived data, and optimization of parameters (e.g., features) of the derived data to be used in signaling by use of specific thinking.

For example, a brain activity monitoring device may output multiple concurrent streams of brain activity monitoring data (e.g., from different sensors). The streams could be combined into a single stream of derived data, e.g., a waveform. Specific thinking may generate or magnify/increase various parameters/features in the derived data waveform that can be used in signaling. In some embodiments, the derived data waveform may be displayed to a user. The user may use specific thinking (e.g., of image or action 1) and experiment with identifying parameters/features that are caused by the specific thinking, and may optimize using specific thinking to generate particular parameters/features. Additionally, the BAM system may include signal processing capability and provide a user interface that may allow the user to tune or modify the displayed derived data (which may include modifying, or generating a modified version of both the displayed data and the stored associated derived data). This could include various controls to allow the user to tune, shape or modify various aspects of the for-use data (e.g. derived data or actual output data), for use in signaling, which may in some ways be analogous to the manner in which a musician or a DJ modifies sound data using a synthesizer. For example, aspects such as gain, equalization based on different frequency ranges, and host of other modifications may be enabled. The user may experiment with different specific thinking as used with different versions of displayed data, and may use controls to emphasize parameters/features caused by the specific thinking as applied to the display data, or modified displayed data.

As such, in some embodiments, the user may use these controls to modify or re-shape the displayed data to emphasize or create parameters/features in association with specific thinking. In some embodiments, multiple streams of derived or output data could be displayed, and the user may be able to use controls to modify each of them, or combine them in different ways. As such, the user may be able to actually generate modified parameter/feature data to optimize it for use in signaling. Furthermore, the user may then be able to modify the modified data, producing still further different parameter feature data, aimed at optimizing it for use in signaling.

Furthermore, in some embodiments, the BAM system may use one or more algorithms or entities, such as artificial intelligence algorithms or entities, in various forms of optimization. For example, the BAM system may enable the user to use various specific thinking as applied to various for-use data. The BAM system may generate various types of for-use data, and the user may experiment with specific thinking to generate or optimize features that may be used in signaling. Furthermore, in some embodiments, both user interaction and algorithms may be used in these various optimizations. For example, in some embodiments, the user may retrieve various stored data resulting from specific thinking and associated with particular for-use data, and may reference it to identify visible parameters features that appear to be associated with specific thinking. The user may then use this in signaling, or further optimize from there.

Additionally, in some embodiments, the BAM system may use one or more algorithms to recognize parameters/features in such stored, experiment data (or experiment data plus stored data from use in messaging or commanding, or both), such as to suggest or provide particular derived data for the user, or to automatically/algorithmically modify to optimize parameters/features generated by specific thinking, whether or not in combination with optimization by user interaction and control (e.g., the BAM system, or the user, or both jointly, may operate in some ways analogously to a musician or a DJ, e.g., in directly or indirectly shaping and optimizing a pattern or waveform using signal processing).

Additionally, in some embodiments, an artificial intelligence model or algorithm may be used in such optimization. For example, stored data, from user experimentation, could serve as the machine learning data set. Artificial intelligence model feature sets could be identified. An artificial intelligence model could then be applied to identify usable or optimal generated or magnified parameters/features that could be used in signaling using specified specific thinking. Furthermore, the model could be used in predicting usable or optimized new specific thinking, derived data, modifications/tuning of derived data (e.g. equalization, etc.) and particular parameters/features, to suggest to the user. The user could experiment (or modify and experiment) accordingly, and the results could add to the training data.

Still further, the foregoing techniques, and/or data produced thereby, could be used in identifying actually what the user is thinking about by brain activity monitoring data. For example, if stored data includes parameters/features associated with the user thinking about image 1, not only can that be used in signaling, but also it could be used in matching the parameters/features to the specific thinking (e.g., image 1), such that, given the parameter/features of the data, in the future, it may be possible, for example, to detect that the user is in fact thinking about image 1. As such, while most embodiments described herein relate to signaling using specific thinking, including specific thinking that may be determined without regard to an associated message or command, in other embodiments, systems are provided that use techniques, data, user interfaces and algorithms as described herein to mine to enable identification of actual specific thinking based on parameters/features of the data. Furthermore, some embodiments provide systems and methods that then leverage that capability. For example, in some embodiments, the techniques may be used to identify various specific thinking of the user. Still further, in some embodiments, to the extent that specific thinking of messaging or commands may be identified, such messaging or commanding may be implemented based on the actual identification of the specific thinking, rather than parameter/feature-based signaling. Additionally, in some embodiments, the resulting data from various of these experiments can be stored, such as in a BAM system database. This can create a reference set of stored parameter feature data in association with specific thinking.

In some embodiments, the computerized brain monitor may be a device that not only senses brain activity and outputs brain activity monitoring data, but also performs processing, or, internally to the device, receives the brain activity monitoring data and performs processing using it, such as to generate, or generate and send, messages or commands to one or more receiving devices or systems. This can include, e.g., storing mapping data, and mapping signals or signal groups or sequences to particular messages or commands. In some embodiments, however, a brain monitor may only. e.g., sense and send brain activity monitoring data to the receiving device(s) or system(s), which receiving device(s) or system(s) may e.g., process the data, store the mapping, and generate messages or commands, and may also, e.g., display the message or implement the command.

Furthermore, in some embodiments, one or more of a CPU, data storage device and BAM program (which can include, e.g., particular application specific software or data) may be included in one or more other devices that may be part of some embodiments of a BAM system, and operations or processing may be performed on any such other devices, such as receiving and processing of brain activity monitoring data to determine user signaling, mapping signaling to messages or commands, and/or sending messages or commands. For example, such other devices may include a device such as a computer, display device, tablet or smartwatch. Furthermore, in some embodiments, a brain monitor may be included within a headset or headworn device that also includes a processor, data storage device, and BAM program. Still further, such devices may include a portable data storage or memory device, or processor and memory device, such as a USB flash drive, thumb drive, etc., which may be used to store or include BAM data, software, application data, etc., which may be inserted into or otherwise used with another device and used by, or incorporated into, the other device. Furthermore, in some embodiments, various aspects or systems of a BAM system may be cloud-based or software.

Additionally, in some embodiments, multiple display devices or displays may be used, such as for preliminary and primary phases, examples of which are described herein, and for other reasons. For example, one display may show more complex or set up data, while another device may provide simple visual, audio or tactile presentations, such as may include alerts that may, e.g., relate to messaging and commanding, e.g., a visual indication or audio sound if a receiving device is coupled with or as part of the BAM system, or if a receiving device already has mapping data established or available, or for other reasons.

Additionally, in some embodiments, a BAM system may be for the use of multiple users, each using a brain monitoring device. For example, in some embodiments, multiple users may participate, such as simultaneously, in messaging or in commanding a device, e.g., one user may have a role to provide commands relating to one aspect of operation of a device (e.g., steering of a vehicle) while another may have another role (e.g., braking of a vehicle). Additionally, in some embodiments, multiple brain monitoring devices may be provided for the use of a single user, such as to monitor for different brain activity parameters, and/or multiple displays or display devices may be provided for a single user, e.g., to display multiple parameters or for other reasons. Furthermore, in some embodiments, a BAM system may include multiple receiving devices or systems, whether controlled by one user, independently or together or by multiple users (e.g., different users or sets of users may be assigned to different devices or systems or sets of devices or systems, etc.), whether for non-gaming applications or gaming applications, such as virtual world or online gaming applications or role player gaming, massively multiplayer online gaming, esports, etc.

Additionally, in some embodiments, a BAM system may include aspects relating to accommodating multiple users, e.g. databases, data, user interfaces, applications. For example, biosignals may or may not be similar for particular users, e.g., for the same specific thinking. In some embodiments, a BAM system for use by multiple users (whether separately and/or concurrently) may, for example, include one or more BAM databases with data (e.g., biosignal data) stored separately for each of multiple users. Furthermore, in some embodiments, data for multiple users may be for some uses combined, e.g., to analyze patterns or similarities between different users, to facilitate optimally selecting biosignal data, or derived data, or sets of condition(s), etc. Additionally, in some embodiments, a BAM system may store profiles and customized configurations for each of multiple users, where each user can log in, or be automatically detected, and the associated customized configurations may be used.

Furthermore, in some embodiments, a BAM system, or a system device thereof, may provide a user with an ability to save or store, and retrieve, BAM related data or items, e.g., displayed images for later review or use. For example, a user's specific thinking (e.g. of a particular image, thing, action, etc.) may generate a display of one or more parameters relating to the associated brain activity, and may wish to save the display for later reference, e.g., to compare it to similar thinking days later or other specific thinking to observe changes or differences, etc. In some embodiments, a BAM system may include one or more databases for saving such data as well as various other data, and may allow storage and retrieval or presentation/viewing of data, etc. Still further, in some embodiments, a user may use a BAM headset in a preliminary mode while, for example, watching a movie (or listening to a song, or some other activity that would naturally impact the user's thinking, for example). The system may allow the user to record the user's biosignals during a portion of, or the entire, time that the user is watching (and listening to) the movie. The system may allow the user to record and store not only the movie, but the user's biosignals, or other biosignal related data, simultaneously with the play of the movie. The user may then be able to playback the movie, such as on one portion of a display, and view the user's biosignals (as the user watched the movie and thought about, e.g., the things that the user was seeing and hearing, plot aspects at that point in the movie, etc.). The user might be able to detect potential usable conditions relating to biosignal related data in relation to movie images, sounds etc. (e.g., when the shark appears, the user notices that a particular parameter/feature of the user's biosignal related data appeared, etc.). Alternatively or additionally, the data could be stored in a BAM database, and one or more algorithms of the BAM system may be used for similar goals. In some embodiments, a preliminary mode of a BAM system allows such exploration, testing and analysis, such as to find useable characteristics of biosignal related data, or to find associations between specific thinking and characteristics of biosignal related data, such as for later use in identifying specific thinking from biosignal related data. Additionally, in some embodiments, a BAM system may provide game or video game applications, allowing a user to, e.g., set up the system, experiment with biosignal generation and condition identification, etc., while providing entertainment in form of a game (e.g., with game displays and/or audio, targets, points, goals, levels. etc.).

In some embodiments, receiving devices or systems can message or signal back to the user, such as to a device of the user. For example, a receiving device or system may send alerts, acknowledgements, or notifications (e.g., a notification (e.g., text, image, video) to a smartphone, tablet, headset, computer, or other device, e.g., of the user) when a message or command is received, when a command is implemented, when a command failed or could not be implemented, outcome or metadata associated with the outcome of the implementation or lack thereof, etc. Additionally, metadata associated with the receipt or implementation of the message or command could be provided, eg., time and data stamp, etc. In some embodiments, such messages, In some embodiments, machine learning or artificial intelligence software may be used, such as in aspects of optimization of signaling, in set up, in mapping aspects, etc.

In some embodiments, a user of a BAM system may be other than a person, such as an animal or other non-human, or artificial intelligence entity, or even non-Earth based life form, and a monitoring device other than a brain monitoring device may be used, such as to sense and output data based on thinking activity. For example, a thinking or thinking organ monitoring system (whether brain or other), whether non-invasive, partially invasive or invasive, could be used for animals, such as e.g., primates, dolphins, cephalopods, octopi (which could take into account their different and less centralized nervous system and thinking), dogs or cats, etc., lower life forms, or other life forms. Parameters could be sensed, and associated parameter data could be defined and generated, even if different than those used for human monitoring.

For example, in some embodiments, training, even without explicit communication, could be used to allow the animal or entity to come to understand signaling and messages or commands associated with signals or groups of signals. For example, a dolphin could be fitted with an appropriate brain activity monitoring device, and could be exposed to training in which, when a brain activity associated parameter of the animal, which may change with different thinking of the animal (for example, this may occur if the dolphin swims a certain way or even just thinks about swimming in a certain way, etc.), rises above some threshold, this is associated with a signal that causes an alert to be presented to a human trainer who, in response, feeds the dolphin a fish. Through the training, and practice during the training, the dolphin may come to understand that, for example, thinking of swimming left, which may cause the parameter to rise above the threshold, causes the trainer to feed the dolphin a fish. For example, at first perhaps the dolphin may actually swim left, but over time the dolphin may come to understand that merely thinking of swimming left is sufficient (e.g., if the dolphin is unable to swim or swim left, but thinks about it while trying to, and maybe comes to understand that thinking about it alone is sufficient). With training, the dolphin might even come to understand different, effectively, messaging or commanding—if it thinks of swimming left, maybe it gets a sawfish, while, if it thinks of swimming right, maybe it gets a mackerel, etc. (it may associate thinking of swimming left with a message to the trainer of (or amounting to) "feed me a fish!").

In some embodiments, a BAM system may effectively provide both a means of communicating (via signaling) and a language with which to communicate (via mapping). The language could include binary sequences 10 signals long and allow a language of more than a thousand messages (e.g., words or groups of words), or sequences 20 signals long to allow for a language of 1 million messages. As such, in some embodiments, a BAM system can allow for a massively compact system and method for communication or commanding (e.g., quantity of messages or commands to quantity of signals required to send any of the entire quantity of messages or commands), or, more generally, of causing or leading to particular outcomes (as described further below). Such outcomes could include simply generating output signal(s) or data based at least in part on obtained or determined signaling, e.g., from a user using specific thinking, or generating and storing output signal(s) or data, such as storing to one or more database(s) for immediate or later use (whether messaging or commanding, or otherwise).

It is noted that some embodiments (for humans or otherwise) use brain activity parameters that may be associated with actual physical action, just thinking, or both. Even using action-based thinking for signaling and command can be greatly useful in some situations or for some users or types of users.

While the human trainer may never know what specific thinking that a dolphin is using to effectively control the relevant parameter, the dolphin may nonetheless be able to use it, e.g., through training, practice, and reinforcement. Still further, intelligent animals such as dolphins may eventually even come to understand that sequences of two or more signals may lead to particular outcomes—e.g., if it thinks about swimming left and then right in succession, it gets fed a squid, etc. The dolphin may be effectively using a BAM system, and leveraging it, to send any of a great many messages or commands, using only a few individual signals. As such in some embodiments, rather than an explicit or verbal message or command, signals, or groups or sequences of signals, may be associated more generally with particular outcomes, actions, or events occurring or not occurring. A similar approach could be used with other animals or other intelligent life forms, even if their thinking is not entirely understood by humans.

Further still, some embodiments provide systems that do not use brain or other organic or biological life based thinking monitoring (sensor based or otherwise), or do not use thinking monitoring at all. It is noted that, although the term BAM is used throughout (e.g., BAM system, BAM program, in some embodiments, the system or program generally represented by a BAM system or BAM program may not necessarily use brain or thinking monitoring). For example, in some embodiments, data may be output that relates to artificial thinking or processing by an artificially intelligent entity (e.g., an artificially intelligent robot, artificial intelligence software, or another artificially intelligent entity)—e.g., the data may be output from an artificially intelligent computerized system, or may be electronically monitored, sampled, provided or output by the entity, or otherwise accessed to allow the generation of associated output, within such a system, which, in some embodiments and in some respects, may, e.g., be conceptually analogous to brain activity monitoring and output brain activity monitoring data. Parameters, and associated threshold, ranges, patterns, etc., could be established relating to or customized to aspects of the processing. Since the entity is intelligent, it could potentially come to be able to use a BAM system just as a biologically intelligent organism could. More generally, any thinking or processing based output, from any intelligent entity, could potentially be leveraged by a BAM system, which could enable signaling, messaging and commanding (or outcome causing) by any such entity. It is noted that, in some embodiments, even biologically intelligent organisms with brains may use a BAM system without brain monitoring, such as by in some way outputting or providing thinking related parameters or parameters over time.

Additionally, in some embodiments, a user may use a BAM system for messaging or commanding of an artificially intelligent entity, such as a robot or a computerized system. In some embodiments, the artificially intelligent entity could receive, or receive and implement, the message or command by itself, rather than a device or system other than itself. Furthermore, in some embodiments, the artificially intelligent entity may be capable of communicating back to the user, such as to a device of the user, whether through or using a BAM system or otherwise.

In some embodiments, sensor(s) (e.g., whether device(s) or system(s)) on/in a headset) detect/sense a brain activity or other biological or physiological parameter (although, with non-biological entities, other parameters may be potentially be sensed, such as electrical parameters such as current or voltage), e.g., related to thinking, and the associated signals are transmitted. In some embodiments, the data from each sensor (whether or not a stream over time), for example, may be termed a biosignal. In some embodiments or instances, each biosignal may contain a potentially vast amount of monitoring data, e.g., brain monitoring data. None, some or all, of the biosignals may be obtained simultaneously, concurrently, or during staggered or overlapping periods of time, and some or all may be collected fully or partially independently or in an integrated fashion. Furthermore, each biosignal may include various characteristics, which may or may not differ from one biosignal to another (potentially including being associated with different parts/regions of the brain). For example, Each or some of the biosignals may have an associated amplitude, frequency, or pattern that is different from one or more other biosignals, over time and/or at a particular time during which they may be concurrently detected.

As noted, a particular biosignal may or may not be a waveform. Furthermore, in some embodiments or examples, each, or groups of, biosignals may include information that is unique to specific thinking, or a category, type, or range of specific thinking (e.g., of image of a running elephant). Still further, in some embodiments or examples, combinations of parameters (e.g, being above or below a specific threshold, within a specified range, etc.)/features associated with each of a group of biosignals, such as concurrently monitored biosignals, may be used to identify (or found and then used to identify) specific thinking, or a type/range of specific thinking (e.g, an image of a running elephant, an image of any running animal, an image of any animal, etc.). For example, it may be the case, or it may be found by a BAM system to be the case (whether or not making use of user input, and potentially using one or more algorithms, such as may include machine learning or artificial intelligence algorithms, including using training data that may include biosignals collected from one or more users, etc.) that a combination including parameters/features of one biosignal (e.g., associated with the left hemisphere of the brain, and including a particular range of slope, frequency, etc.) along with those of another biosignal (e.g., associated to the left hemisphere of the brain, including some other one or more parameters) is indicative of, or uniquely associated with, specific thinking or a category, e.g., content based range, of specific thinking (e.g., an image of a running elephant, an image of a running animal, etc.). Furthermore, in some embodiments, as described herein, a BAM system may collect and store data, such as biosignal data (potentially along with associated specific thinking and input by a user to the system), and such as using one or more algorithms and/or user interaction/input.

In some embodiments, a BAM system may identify one or more parameters/features of biosignals (e.g., one or multiple data sets or streams, etc.) or data derived from biosignals (whether display or for display, or not). Data derived from biosignal data can include, e.g., combined biosignal data, modified biosignal data, combined and modified data, biosignal data to which one or more mathematical functions or models have been applied to modify the data, data modified by one or more algorithms or artificial intelligence models or algorithms of a BAM system, data modified at least in part based on user input or interaction, such as with a BAM system, etc. Herein, the term biosignal related data may include, e.g., biosignal data itself (e.g., brain activity monitoring data), and/or data derived from biosignal data.

In some embodiments, one or more characteristics (e.g., parameters/features, which may be value-related) of biosignal related data may be associated with specific thinking (e.g., of image or action 1). In some embodiments, a BAM system may provide for a user to use specific thinking (e.g., of image 1) to satisfy one or more conditions associated with sending a signal (e.g., a parameter value above a threshold, a feature like a specifically defined slope or notch being produced in the biosignal data, etc.). As described further below, in some embodiments, a BAM system may even be able to identify specific thinking (e.g., if image one, or a category of specific thinking including image 1, etc.) by utilizing associated characteristic(s) of biosignal related data. Other embodiments may use the associations in other ways.

As such, in some embodiments, the condition(s) in biosignal related data associated with specific thinking may be used in various ways. In various embodiments, and for various uses, the condition(s) may be required to be sufficiently associated with the specific thinking (e.g., of image or action 1), such as may include being sufficiently not associated with other specific thinking (e.g, of image or action 2 or 3). In some embodiments, the condition(s) may need to be sufficiently uniquely associated with the indicated specific thinking—e.g., such that the condition(s) arise all or a very/sufficiently high percentage of the time that the specific thinking is employed, and such that the conditions arise none or a very/sufficiently low percentage of the time that the other specific thinking is employed. In various embodiments, the other specific thinking could include any other specific thinking, or just certain other specific thinking or groups or categories of specific thinking. For example, in some embodiments, the conditions may need to be sufficiently not related (e.g., of image 1) only to other specific thinking that is, or is sufficiently likely to occur, or that is or may be used by the BAM system. For example, if mapping is to used to map four sets of conditions (where a set of conditions can be or include one or more conditions), e.g. sets of conditions 1-4 to four different messages or commands, e.g., messages or commands 1-4, then the other thinking may need to at least include the specific thinking associated with the other sets of conditions. For example, specific thinking 1 (e.g., of image or action 1), used to satisfy set of conditions 1 and associated with message or command 1, may need to be sufficiently not associated with conditions 2-4, associated with messages or commands 2-4. In some embodiments, the requirements for sufficiently unique association are driven at least in part by practical considerations (e.g., degree of reliability, accuracy, speed), and/or by distinguishability between associated sets of conditions. For example, specific thinking 1-4 may need to be sufficiently uniquely associated with sets of conditions 1-4, respectively, such that sufficiently high quality (reliable, accurate, fast, etc.) messaging and commanding can be achieved. Furthermore, in some embodiments, the BAM system, using one or more algorithms, or the user via user input or selection via the BAM system, or both, may be used in determining or selecting, e.g., conditions required for sufficient unique association.

For example, using techniques such as those described, embodiments or examples of a BAM system may be usable in various different ways. For example, a BAM system may use conditions (e.g., above or below a threshold, within a range) associated with parameters/features relating to biosignals or combinations of biosignals in signaling, where, e.g., a user uses specific thinking to generate biosignals reflecting meeting the conditions and associated with the signaling. In some examples, it may not be necessary that the used specific thinking (e.g., of image or action 1) is uniquely associated with the specified conditions. For example, it may be the case that various specific thinking (e.g., of image 1, 2 or 3 or of action 1 or 2) may allow meeting the specified conditions. However, in some examples, it may be the case that specific thinking (e.g., of a running elephant) or a type or range of specific thinking (e.g., of any running animal) may be sufficiently or uniquely associated with specified conditions. As such, in some embodiments, or examples, specified conditions may be used to actually identify the specific thinking, or the type of range of specific thinking, corresponding with specified conditions. As such, in some embodiments, a BAM system could be used to identify specific thinking, e.g., that the user is/was thinking about a running elephant. Furthermore, in some embodiments, condition(s) may be found to sufficiently or uniquely correspond even to particular messages or commands. In such instances, a BAM system may be used to identify particular messages or commands that the user is thinking of, and may send associated messages or commands, such as to a receiving device or system. Furthermore, in some embodiments or examples, the system map specific thinking X (e.g., a running elephant) to message A or command B and may send message A or command B (e.g., the user thinking about a running elephant or a running animal may map/correspond to a message of "hi there" or a command of ("draw a blue vertical line").

In such examples or instances, a BAM system may identify specific thinking and identify and send associated messages or commands, e.g., without necessarily using parameter based signaling mapped to messages or commands. Some embodiments of BAM systems include various combinations of these aspects/operational features. Additionally, in some embodiments, a BAM system may use identified specific thinking in other ways, including using mapping and associated sending or presentation of content sending or presentation, such as to present sensory or other data relating to the identified specific thinking (e.g., when the user thinks of a running elephant, an image or video of a running elephant is displayed). As such, some embodiments include more or other than messaging or commanding (e.g., presenting) and more or other than signaling based on parameter value related conditions.

In some embodiments, biosignal related data and/or sets of condition(s) can be determined, or optimal such data may be determined, using one or more BAM system algorithms or artificial intelligence algorithms, or by/with user interaction, or both. For example, a BAM database may store large amounts of biosignal data. This data may represent a large amount of waveforms or patterns, from which a massive amount of parameters/features and associated conditions and sets of condition(s) might be identified. As such, a massive variety of biosignal related data may be determined/generated, and, based on that data, any of a massive variety of potential sets of condition(s) may be identified. In some embodiments, algorithms may be used to identify or determine optimal biosignal related data and/or optimal sets of condition(s) from stored data. Furthermore, in some embodiments, a user may input, direct or command the BAM system to explore or use particular biosignal related data (or ways to generate such data) and/or particular conditions or sets of condition(s) that the user may feel or have reason or experience to believe may be more optimal or more likely to be optimal than other such data.

As described, in some embodiments, a BAM system stores and analyzes monitored data, etc., such as instances a user using specific thinking (which the user may or may not actually input/identify, e.g., by a user interface or otherwise), including over time (e.g., different days), for later use, mining, and identification such as described herein. Additionally, in some embodiments, a headset (or other device) could be worn (or otherwise kept with or proximate to) a user, for use in collecting and storing (e.g., by wireless data transfer) monitored brain activity over a long period of time, e.g., a day, week, month, etc. That data could then be analyzed/mined, such as to determine brain activity associated with different time periods, user activities, user mental conditions or states, such as hunger or desire, or brain activity monitoring patterns associated with different user conditions or states, etc. Additionally, data could be provided or sent, e.g., notifications, to the user, such as "alert, specific thinking of an image of an elephant detected on X day at X time," etc.

In some embodiments, a BAM system provides for monitoring, analysis, and modification of biosignals, or signals derived therefrom, or display data derived therefrom, such as may relate to, e.g., modifications or changes relating to gain, amplitude, frequency, equalization, analog/digital conversion, gating, filtering, temperature, other chemical, biochemical or physical conditions. In various embodiments, data may be initially collected via analog or digital, and may be converted to digital as needed. As described, this could be used in accentuating or improving/increasing the magnitude or identifiability of conditions, such as conditions associated with specific thinking, such as may be used for, e.g., signaling for mapping to messages or commands, or identification of specific thinking, e.g., for use in messaging or signaling, etc. This could include identifying, selecting or isolating parameters/features and conditions from the data, which could include comparing different data, etc.

Some embodiments also including algorithms that use searching, such as of data stored in a relational database, that can include biosignal data, derived data, mapping data, specific thinking data, etc., and/or allow a user to perform searches and obtain search results, such as by particular search parameters (e.g., data related to specific thinking, etc.). Some embodiments use biosignal data in conditions (e.g., associated with signaling or identifying specific thinking), or modified and/or derived data from biosignal data, or combinations of both. Furthermore, in some embodiments, multiple sets of one or more conditions associated parameters/features associated with specific thinking (e.g., of a dozy dog) may be used in signaling or identification of specific thinking.

Some embodiments also identify groups or sequences of specific thinking, or types/categories of specific thinking, itself, and use that, such as in mapping of groups or sequences of specific thinking that maps to particular messages, commands, presentations or other output or outcomes. As such, in some embodiments, signaling can be based on identified specific thinking, rather than, or in addition to, signaling based on conditions relating to parameters/features.

Some embodiments include a recognition that communications (or other outcomes) based on physical movement, even the movement or clicking of a mouse, or speaking, may, or may be viewed as, including a middle or additional step that, in some cases at least, may be eliminated. Physical action based communications may include a step of generating thinking/mental conditions associated with movement associated with the desired communication (and/or commanding) and generating associated physical movement to generate the desired communications. Some embodiments provide systems, methods, apparatuses, devices, and computer readable media that leverage, provide for or use of thinking/mental conditions to generate desired communications, without a step or aspect relating to physical movement. Furthermore, in some embodiments, a BAM system may use one or more algorithms, such as one or more machine learning algorithms, in identifying sets of conditions that are uniquely associated with specified specific thinking, as described further herein.

Furthermore, in some embodiments, more than one specified specific thinking may be associated with a set of conditions, in which case sufficiently unique association may require that both specific thinking instances are sufficiently associated with the set of conditions, and potentially not associated with other conditions. Still further, in some embodiments, sets of conditions may themselves be associated with or mapped to specified messages or commands. This data could be stored in one or more BAM databases, such as relational databases.

For example, in a BAM system, specific thinking 1 (of an elephant) may be used to generate a set of conditions 1 (amplitude over specified threshold) that maps to a desired message or command (paint in the color blue). However, it may be determined that other specified specific thinking (e.g., of a rosebud) may also used to generate set of conditions 1, and that both specific thinking 1 and 2 are sufficiently uniquely associated with set of conditions 1 (e.g., they both produce set of conditions 1 all or almost all of the time, and they don't produce other sets of conditions associated with or mapped to other messages or commands). In some embodiments, both specific thinking 1 and 2 may be mapped to message or command 1, or may be mapped to set of condition(s) 1, or both. For example, in some embodiments, a BAM system may provide for a user to send message or command 1 by using either specific thinking 1 or 2. Alternatively, if only one of specific thinking 1 and 2 may map to set of conditions 1 or message or command 1, but the user may find that using the other of specific thinking 1 and 2 also works (and, e.g., is sufficiently uniquely associated with set of condition(s) 1, e.g., by reliably causing set of condition(s) but never or sufficiently rarely causing sets of condition(s) 2-4, etc. Furthermore, in such instances, e.g., a user may input/add the other of specific thinking 1 and 2 to the mapping database in accordance with the particular BAM implementation.

For a simplified example, a user may put on the BAM headset and select (in some way, whether by physical action, action of an assistant, and/or even using pre-established thinking/signaling, depending on the BAM implementation) to use it in preliminary mode (as exemplified herein). The BAM system includes software to provide for or aid in identification of sets of condition(s) associated with biosignal related data. The BAM system provides a display (representing or including display data) associated with the biosignal related data associated with biosignal data associated with brain quadrants 1-4, where the associated display data is displayed in a color corresponding with the quadrant, e.g., blue, pink, yellow and red for quadrants 1-4, respectively. Furthermore, the display data is displayed in a shape corresponding with a frequency range of the of biosignal related, with square, star and circle corresponding with frequency ranges 0-10 Hz, 11-20 Hz and 21-30 Hz (or other units, whether associated with biosignal data or parameters of biosignal related data derived from biosignal data).

Continuing the example, the user, looking at the BAM system display, clicks "start" and thinks of various things, while the BAM system is sensing and recording biosignal data. In some embodiments, the user may input/enter the specific thinking that the user is engaging in/employing during the period of time (e.g., seconds) that he is employing each specific thinking, and this data is also stored by the BAM system in association with the corresponding biosignal data.

For various different specific thinking, which the user inputs to the BAM system, the user notices no, no meaningful, insufficient, or very little change or significant visible item in the display. However, when the user uses specific thinking of an image of an elephant, the user sees a pink circle on the display (in other examples, a sequence of different specific thinking could be used, etc.). The user continues to use various different specific thinking, not of an image of an elephant, again with, e.g., no change or significant visible item in the display, yet, each time that the user thinks of an image of an elephant (and enters in "elephant" to the BAM system to identify the specific thinking that the user is employing), the pink circle appears (the BAM system detects that the biosignal related data relates to brain quadrant 2 and is in the 21-30 Hz frequency range). At this point, the user takes off the headset and reviews the recorded display, which shows a recording of the display of the biosignal related data, along with, at the top of the screen, the text that the user entered for/identifying/specifying each specific thinking when the user was employing it. Whenever the text, "elephant" appears, the pink circle appears as well. The user may now save "elephant" as a usable or potentially usable specific thinking, such as subject to one or more of, e.g., further testing, further user interaction, analysis by algorithm(s) of the BAM system such as may used stored data, etc. If, currently or at a later time, the system determines that the set of conditions (e.g., that the particular biosignal related data relates to brain quadrant 2 and is in the 21-30 Hz range) is sufficiently uniquely associated with the specified specific thinking (of an image of an elephant), then this set of conditions may be stored as a usable set of conditions and mapped to the specific thinking of, e.g., an image of an elephant.

Additionally, in some embodiments, a BAM system could display an image associated with specific thinking. For example, if specific thinking of an image of a fox produces brain activity monitoring related data that satisfies a set of condition(s) leading to the presentation of a red circle, the system might be set (e.g., through customization, setting or selection by the user) to instead show an image of a fox whenever that set of condition(s) is satisfied. If it turns out that other specific thinking, e.g., of a dog, satisfies the same conditions, then the user may find that the user is reminded better of this by the image of the fox than of the red circle. Additionally, data associated with different but related (e.g., narrower or broader) specific thinking could be used in determining the breadth, or breadth along particular dimensions, of specific thinking that produces a set of condition(s), e.g., thinking of an image of a fox or thinking of an image of any four legged animal, e.g., a leopard, or thinking of a running fox or thinking of any running animal or running generally, etc. Additionally, in some embodiments, the BAM system may display multiple images associated with satisfaction of the set of conditions—e.g., an image of a fox and an image of a leopard, etc., which might be used to cue the user's memory, aid in determining specific thinking of ranges/breadth of specific thinking used or usable to trigger the set of condition(s), etc.

At this point, the user may want to associate the specific thinking of an image of a fox with a particular message or command (e.g., command 1, which may be a command to paint in blue). Using a GUI of the preliminary mode, the user sees a displayed table with two columns, one for "thoughts" and one for "Messages or commands." The user sees (or selects/searches for and then sees) "image of fox" in the thoughts column. He may now enter a value in the "thoughts" column. He enters "1" to associate the image of a fox thought (or thinking) with command 1, which is the command to paint in blue. Based on this, the system associates or maps (and stores) the set of conditions of: (1) biosignal related data relating to brain quadrant 2 and (2) biosignal related data in frequency range of 21-30 Hz, with command 1—paint in the color blue.

In an example of a user using a BAM device in primary mode, the user may first put on the BAM headset. In this example, the user wants to command a talking doll that represents a character in a move. Specifically, the user wants to command the doll to say "use the force!" This command is mapped to specific thinking of an image of an elephant. The user thinks about an image of the doll, and then thinks about every line that the user can remember that character saying in the movie, including "use the force!" the doll does nothing, since none of that specific thinking is mapped to any command in this application. Next, the user thinks about an image of an elephant, and the doll says, in a voice of terrific gravity, "use the force!"

It is possible that, at this point, user uses the BAM system in preliminary mode and notices that he sees a blue square every time he thinks of the words "use the force!" being spoken (or, in a variation of this example, only when the user thinks of those words being spoken in a deep, serious voice), and is able to establish the specific thinking of words "use the force!" being spoken as a usable for commanding. Astounded by the staggering coincidence, the user maps the specific thinking of the words "use the force!" being spoken with a command commanding the doll to say the words "you must learn control!" Next, using the BAM system in primary mode, the user thinks of the spoken words, "use the force!" and the doll speaks, "you must learn control!"

Some embodiments include calibration, or periodic calibration, of various aspects of a BAM system, such as to adjust to compensate for changes that may occur over time and affect system operation, such as in connection with brain activity monitoring and signaling. For example, it may be recognized that there is a possibility of biosignaling associated with specific specific thinking changing over time, such as due to changes relating to the user's thinking.

Additionally, in some embodiments, it may be possible for a user to use practice or training, including thinking, to, to some degree, "re-wire" the user's neural activity and patterns, such as to cause specific thinking to lead to different biosignal related data patterns than before the practice or training. For example, it may be possible for the user to initially use thinking of an elephant, to satisfy a set of condition(s), where the set of conditions (and potentially also the specific thinking of an image of an elephant) is mapped to and used to send the command, "paint in blue." With practice or training, however, it may be possible for the user to modify the biosignal related data associated with the user thinking about the words "paint in blue" so as to cause specific thinking of the words, "paint in blue" (e.g., spoken or written) to satisfy the set of condition(s). In that case, the user may be able to use thinking of "paint in blue" to send the command "paint in blue" (potentially as an alternative to specific thinking of an image of an elephant"). As such, in some embodiments, with training of practice, a user may be able to establish a set, or language of messages or commands that actually correspond to the messages or commands that are sent using that signal (or a sequence including that signal, etc.).

FIG. 2 is a block diagram of an example BAM system 200, including an example BAM database 114. In various embodiments, the BAM manager 102 may or may not include the BAM database 114. The system 200 includes user device(s) 104, a display/GUI 108, brain activity monitoring device(s)/system(s) 118, facilitating computer(s) or computerized system(s) 112, and receiving or interacting device(s) or system(s) 116, which may implement command(s) or present message(s). Various combinations of the devices or systems may be coupled, such as for one or two way communication, by one or more wired or wireless networks 110. A user 106 is also shown. The facilitating computer(s) or computerized system(s) 112 includes the BAM manager 102 and the BAM database 114, including, in the embodiment depicted, signal/data set or sequence to message or command correspondence data, examples of which are further described herein (which may include, e.g., one or more tables or other data structures and/or may include a relational database).

Figure 3:
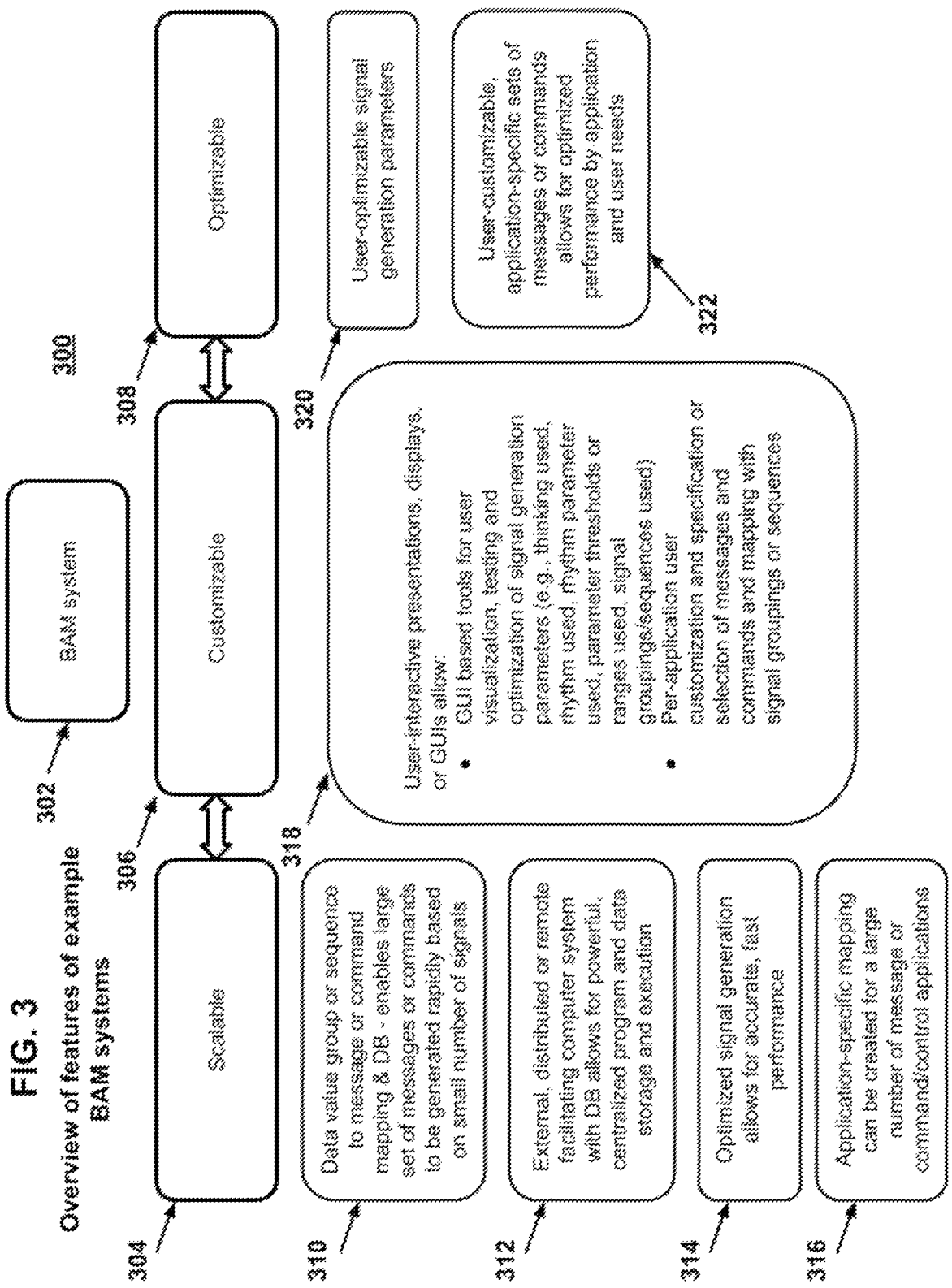
FIG. 3 is a block diagram illustrating an overview of example features of a BAM system, in accordance with some embodiments of the invention.

FIG. 3 is a block diagram 300 illustrating an overview of features of example BAM system(s) 302. In various embodiments, a BAM system may incorporate one or more of the described features. For example, a BAM system may be provided that is scalable 304 (e.g., by user), customizable 306 (e.g., by user) and/or optimizable 308 (e.g., by user).

Example BAM systems may include various features that facilitate or provide scalability 304 in various regards. For example, these features may include signal group/set or sequence to message or command mapping and an associated database 310, which may, e.g., facilitate enabling a large set of messages or commands to be generated rapidly based on a small number of signals. The features may also include an external, distributed or remote facilitating computer system (e.g., including one or more servers), with one or more databases 312, that may facilitate or provide powerful, fast, reliable, centralized BAM program and data storage, and BAM execution. The features may also include facilitation or allowing of optimized signal generation 314, allowing for fast, accurate, reliable performance and operation. The features may also include application-specific or use-specific mapping (e.g., of signal groups/sequences to messages/commands) 316 that can be created or customized, and stored, for a large number of messaging or command applications or uses.

Example BAM systems may also include features that facilitate or provide customizability 306 in various regards. For example, these features may include user-interactive presentations, displays or GUIs 318. The presentations, displays or GUIs may facilitate or provide, e.g., user visualization, testing and optimization of signal generation (e.g., relating to the thinking used, the region of the brain used, the rhythm used, the rhythm or rhythm data related parameter used, parameter thresholds or ranges used, or signal groupings or sequences used). The presentations may also facilitate, e.g., application or use specific and customized messages and/or commands and mapping or association with particular signal groups or sequences.

Example BAM system may also include features that facilitate or provide optimizability 308 in various regards. These features may include, e.g., user-optimizable signal generation parameters and associated tools 320, and user-customizable, application-specific sets of messages or commands 322 that facilitate or provide for optimized performance taking into account factors including the application and needs or preferences of the user.

Figure 4:
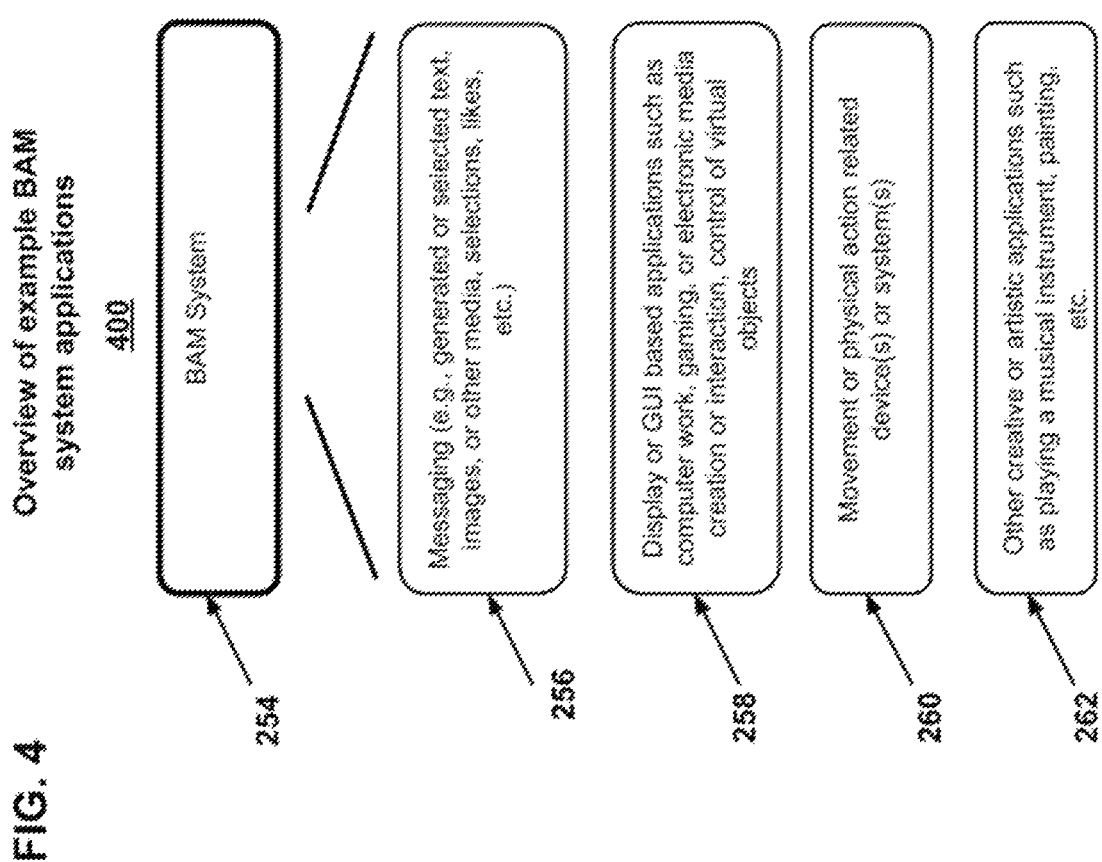
FIG. 4 is a block diagram illustrating an overview of various applications of a BAM system, in accordance with some embodiments of the invention.

FIG. 4 is a block diagram illustrating an overview 400 of various applications of example BAM system(s) 254, or that example BAM systems may facilitate or provide for, in accordance with some embodiments of the invention. These applications may include messaging 256, such as may include, e.g, user generated or selected text, images or other media, selections, likes, etc. The applications may also include display or GUI based applications 258, e.g., computer work (e.g., including simple pointer movement and complex computer interactions and gaming, or electronic media creation or interaction). The applications may also include movement or physical action related device(s) or system(s) 260, such as may include, e.g., robotics, pneumatics, actuation, movement or action not including the user, transportation of the user, or movement or action of the user or one or more parts of the body of the user.

Various other applications may include various types of devices, e.g., remote controlled devices (or any other devices) that may, e.g., move, have moving parts, and may have other remotely controlled features such as lighting, a speaker/audio, other sensory features, or message display/presentation capability, that may be remote controlled, whether for the use of the user or another, e.g., in communication or in a mutual control of personal devices of the user.

Other applications may include devices or systems, such as remote controlled, robotically controlled and/or messaging devices, whether local or remote to the user or a BAM system, or for the personal use of the user, or one or more others, or the user and one or more others, or a group of one or more others, variously including, e.g., devices for personal, pleasure, play, toys, sports, esports events or tournaments, gaming, work, business or industrial use.

The applications may also include various other creative or artistic applications 262 such as, e.g., playing a musical instrument, painting, remotely controlled/remote controlled devices, etc. For example, particular sequences can map to particular notes to be played on a robotically or otherwise automatically controlled musical instrument, the length of the notes, other features of the sound, etc. In computer control type applications, for example, bit sequences can map to particular actions, like clicking, direction or speed of movement of a pointer, the taking of particular actions, e.g., in a video game, firing or using a particular virtual weapon or item, etc. In some embodiments, mapping can be customized to the particular application, such as a video game, whether such mapping is determined by the user or otherwise, such as by being provided, or being provided as a template but customizable by the user. For example, in some embodiments, a video game could be sold along with software based mapping of sequences to commands, including taking of specific actions, in the video game, or, for a robotically playable musical instrument, the item could come with software provided a mapping or suggested, user-customizable mapping of sequences to notes, etc. Similarly with messaging, for a particular message related application, provided or suggested mapping could be included, e.g., for messaging relating to introductory chat, mapping could be provided including sequences corresponding to basic introductory phrases, etc.

Figure 5:
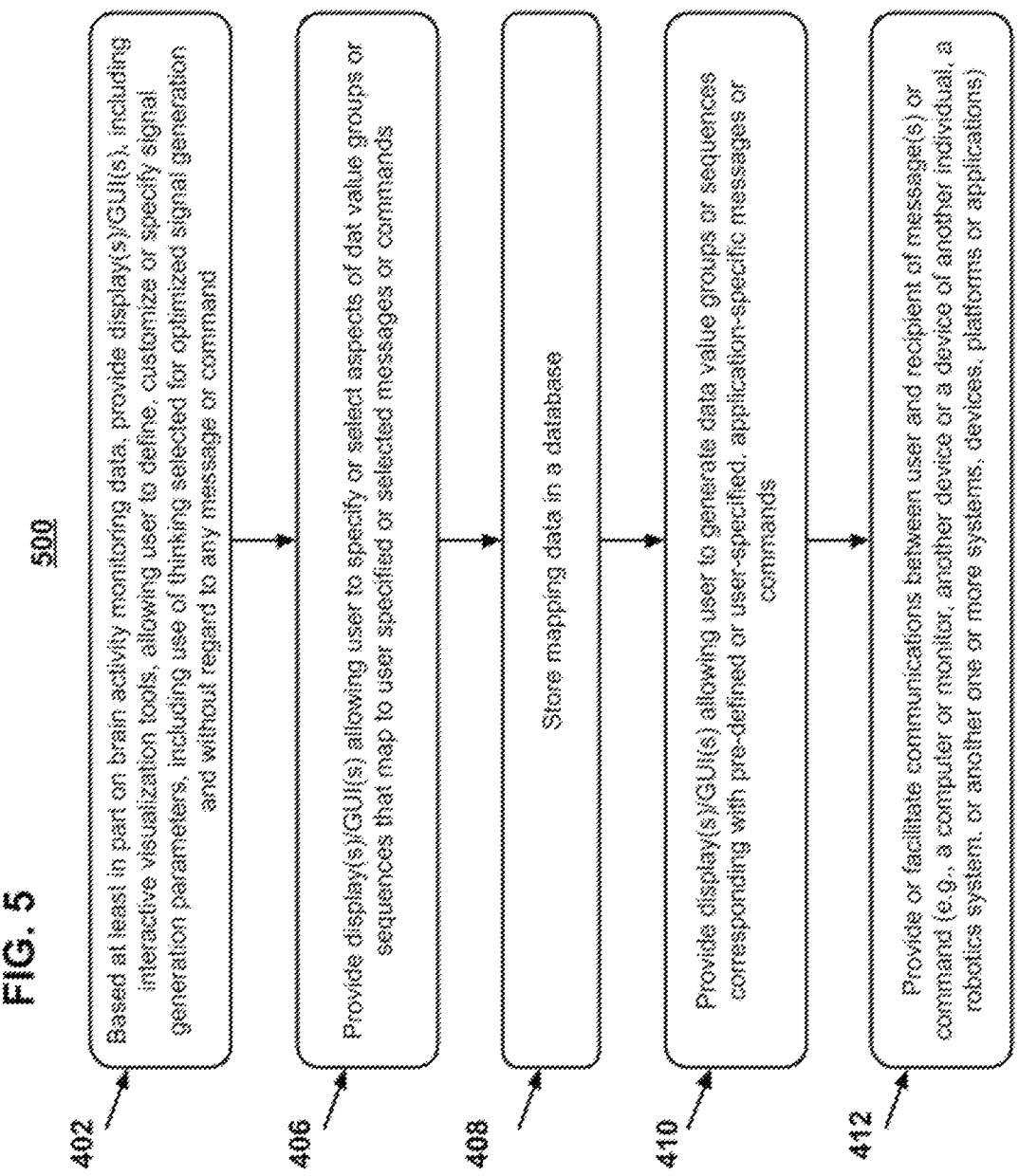
FIG. 5 is a flow diagram illustrating an example BAM method.

FIG. 5 is a flow diagram illustrating a method 500 in accordance with some embodiments of the invention, such as may be implemented at least in part by a BAM system or one or more algorithms thereof.

At step 402, the method 500 includes, based at least in part on brain activity monitoring data, providing display(s)/GUI(s), including interactive visualization tools, allowing user to define, customize or specify signal generation parameters, including use of thinking selected for optimized signal generation and without regard to any message or command including content of any message or command.

At step 406, the method 500 includes providing one or more displays or GUIs allowing a user to specify or select aspects of signal groupings or sequences that map to user specified or selected messages or commands.

At step 408, the method 500 includes storing mapping data in a database, e.g., associating signal groups or sequences with messages or commands.

At step 410, the method 500 includes providing displays or GUIs allowing a user to generate data value groups or sequences corresponding with pre-defined or user-specified, application-specific messages or commands.

At step 412, the method 500 includes providing or facilitating communications between user and recipient of message(s) or command(s), e.g., a computer or monitor, another device or a device of another individual, a robotics system, or another one or more systems, devices, platforms or applications.

For example, in some embodiments, a BAM system may be used in interacting with, communicating with, controlling, commanding, or operating any of various software, gaming applications, phone or smartphone features or applications, virtual objects, systems or devices, navigating or operating within virtual worlds, navigation or operation within or of enhanced reality, virtual reality (VR) environments, virtual worlds, 3D worlds, etc. Furthermore, in some embodiments, a BAM system may be portable or wearable.

FIG. 6-8 illustrate waveforms 600, 700, 800 representing examples of parameter tracking data, and associated features, such as morphological features, including signaling thresholds and ranges, in accordance with some embodiments of the invention. In various embodiments, such data or tracking data may be displayed, or may not be displayed, and may be used in signaling whether or not it is displayed. As such, for example, the patterns and waveforms shown in FIGS. 6-8 may illustrate data even if the data, in use in a BAM system, is not actually displayed as shown in the figures.

In various embodiments, tracking data (which can be or include biosignal related data, as described herein) displays can take on various forms, including patterns and waveforms, including signal patterns and signal waveforms and oscillating waveforms. Waveforms, whether regular or irregular, and can include, e.g., particular types, e.g., periodic, sine, square, sawtooth, rectangular, triangular, trigger, pulse, function generated, uniphasic, biphasic, etc. In some embodiments, one or more parameters of tracked brain activity monitoring data are presented, or taken into account in generating a presentation, including one or more waveforms. For example, a waveform may be displayed, in real time or near real time (e.g., within fractions of a second, one second, or several seconds of real-time) or otherwise, that shows variation of a parameter, e.g., current or voltage amplitude (e.g., if electrical voltage, in microvolts), relating to, e.g., a brain wave pattern or rhythm (e.g., a mu rhythm). However, in various embodiments, tracking data, and tracked parameter value variation, may or may not exhibit rhythm or waveform appearance or features 7, and can be of any pattern or change, over time or otherwise. Furthermore, any of various features of the pattern or waveform may be used in signaling or definition or identification of signals. Furthermore, in some embodiments, a combination of features, or criteria based on various features, may be used or required to generate a signal.

FIG. 6 depicts an example displayed tracking data waveform 600. Various aspects or morphological features, which may be shown or occur over time, of the waveform 600 can be observed, including dips 654, 664 notches 660, 662 a sloping roof 656, an elbow 658, phase changes, etc. In some embodiments, one or more features occurring over a specified period of time (e.g., seconds or fractions of a second) (on the horizontal axis) based on a value of a tracked parameter value or magnitude (on the vertical axis) may be used in determining, selecting, identifying or defining a signal or signal value.

For example, generation of a particular binary signal, or which may lead to a data value analogous to a "bit" (e.g., determined to have one of two values, which can be defined as a value of 0 or 1), may be dependent on a condition relating to the tracked parameter value over a specified period of time. For example, the condition(s) may be that the value be above or below a particular threshold for the entire period of time (or some identified minimum percentage of the time, e.g., 90%, etc.), or be within a particular range for the entire (or a specified minimum percentage of) the period of time. It is noted that, e.g., a first condition may be that a value of a parameter meets a specified value-based requirement (e.g., by being above a certain threshold or within a certain range for an entire specified period of time), and a second condition can be that the value of the parameter does not meet the value-based requirement (e.g., by not being above the certain threshold for the entire period of time), and a value of the signal may be assigned one value if the first condition is met and a second value of the second condition is met.

If the condition(s) is met, e.g., the data value associated with the signal could be defined as having a value of 1, whereas, if the condition(s) is not met, then the data value could be defined as having a value of 0. Alternatively, if the data value is more than binary, such as ternary or greater than ternary (e.g., 4 or more possible signal values), then the condition(s) may specify, for example, each of three, four or more ranges, and the value of the data value (e.g, 0, 1, 2, 3, etc.) may depend on what range the parameter value is in for the entire specified period of time (or some specified percentage thereof) (e.g., a value of 0 if in a first range, a value of 1 if in a second range, etc.). Variously, ranges may be specified as, for example, being between two specified values, or being above or below a specified value (e.g., if above 100, value 0 assigned, if between 80-100, value 1 assigned, if between 60-80, value 2 assigned, etc.).

As a specific example, as depicted in FIG. 6, the specified period of time 652 may be between the earlier time indicated by arrow 674 and the later time indicated by arrow 676 (which may be separated by, e.g, seconds or fractions of a second, including, e.g., 10-100 seconds, 5-10 seconds, 3-5 seconds, 1-3 seconds, 1-2 seconds, 1 second, 0.5-1 second, 0.1-0.5 seconds, 0.1 0.5 seconds or less than 0.1 seconds). As one example, for a binary data value, for the entire (for example, or could a specified percentage thereof) specified period of time, if the parameter value is in the range 682 bounded by the values indicated by horizontal lines 670 and 672, then the data value could be assigned as 1, whereas, if the signal is outside that range for the entire period of time (or specified percentage thereof), then the data value could be assigned as 0. In another example, if a ternary data value, if, for the specified period of time (or specified percentage thereof), the value of the parameter is within the range 682, then a first value may be assigned (e.g., 1), if the value of the parameter is above the range 682, thus being in range 680 (e.g., a range including any value above the value indicated by horizontal line 670), then a second value may be assigned (e.g., 0), and if the value of the parameter is below the range 682, thus being in range 684, then a third value may be assigned (e.g., 2).

FIG. 7 an example of parameter tracking data 700 used in creating a displayed waveform 502. In one example, for the entire period of time between the times indicated by vertical lines 674 and 676, if the tracked parameter value is in range 510, bounded by the parameter values identified by horizontal lines 514 and 516, then a data value (corresponding with the signal) could be assigned as 1, and, if not, then a data value could be assigned as 0. In the example shown, since the parameter value is within the range 510 for the entire specified period of time, the data value would be assigned the value of 1. For example, in some embodiments, a user may be able to use specific thinking, such as thinking of making a fist, to cause the user's mu rhythm to attenuate or cause the value of the amplitude of the mu rhythm to be within range 510, below a threshold, etc.

FIG. 8 provides an example 800 of ternary signaling. As depicted, it can be seen that for particular periods of time (with time elapsing from left to right), the waveform 852 varies, for a first period of time (T1 to T2, with T2 being later than T1) staying within an upper range 802 (greater than a specified upper value as shown by line 808), for a later period of time (T3 to T4) staying within a lower range 806 (lower than a specified lower value shown by line 810), and for a still later period of time (T5 to T6) staying within a middle range 804 (between the upper value 808 and the lower value 810). In one example, the signal can be defined as 0, 1 or 2 if the parameter value is, for an entire specified period of time, the upper range 802, the middle range 804 or the lower range 806, respectively (or, e.g., based on the average of median value for the period of time etc.). If a series of multiple periods of time are specified, then multiple signals can be specified. In other embodiments, a signal value at a specific time may be used (e.g., time T1.5), or a signal value crossing a threshold value (not necessarily time-specified) can be used (e.g., crossing from lower to higher can be one signal, associated with one data value, and crossing from higher to lower can be another signal, associated with another data value. Furthermore, a single sequence of signals can be defined as a sequence (or non-sequential group) of a certain number of sequential signals.

That single sequence can, for example, be mapped or associated with a particular message or command, which mapping can be stored in a database, and, e.g., can be defined and customized by the user, e.g., before signal generation. For example, in some embodiments, the waveform 852 shown may indicate a data value sequence of 0 (signal in the upper range), 2 (signal in the lower range), 1 (signal in the middle range), thus generating a sequence of 021. The sequence of 021 can be mapped with a specific message, such as "I'm selecting and sending this message using a BAM system." As such, in some embodiments, if the user wishes to send the message, "I'm generating this message using a BAM system," then the user may use thinking to cause the user's tracked parameter value to meet the conditions presented above, so as to cause generation of the sequence 021 which is mapped to the message, "I'm generating this message using a BAM system," which the user may have earlier defined, and which may be stored in a BAM database. Furthermore, in some embodiments, the user may use only thinking, without any need for any particular physical movement, to produce the sequence (although, in some embodiments, combinations of thinking and other factors, which may include physical movement, could be used). In other variations, a signal (binary, ternary or otherwise) could be sent based on, e.g., the amplitude at a given time, the amplitude passing a threshold 810 from high to low (as shown by feature 820) or low to high (as shown by feature 822), or in other ways. Furthermore, combinations of thinking-based parameters and criteria could be used, or combinations of thinking-based and movement-based criteria or parameters could be used, or just one or more movement-based parameters or criteria could be used. Furthermore, while a ternary signal is shown, in other embodiments, binary signals could be used, or signals associated with 4 or more potential values could be used.

Furthermore, the thinking used may be, e.g., without regard to the message itself, including any content thereof. For example, if mental imagery thinking is used, the mental images (e.g., visual images such as colors, motion images such as the position of an arm or hand or the making of a fist, as just some of many possible examples) may be determined or selected by the user without regard to the message that the resulting signaling is used to determine or select. For example, the user may know (or be displayed a table that indicates) that the sequence 021 is associated with the message, "I'm generating this message using a BAM system," and may use thinking unrelated to this message to generate the sequence to lead to this message being generated. Furthermore, in some embodiments, such as using one or more GUIs, the user may select, or test, determine and select, specific thinking or types of thinking used to generate signals, and may choose specific thinking so as to optimize and/or customize one or more aspects of signal generation (e.g., speed, accuracy, reliability, precision, comfort, enjoyability, etc), or based on other factors, such as, e.g., comfort, ease, enjoyability, safety or preference.

FIG. 8A provides simplified examples of signaling. A signal may be generated, e.g., at a particular time, which may not be preset, when a specific thinking based data parameter(s)-based condition(s) is met, (e.g, one or more parameters meet particular conditions, the waveform passes a specified threshold, or passes it from high to low or low to high, etc.). For example, in plot 852, particular signals, corresponding with, e.g., data values desired to be sent by the user, may be identified based on a monitored brain activity associated data stream or waveform 856 (which, in various examples, may be of any of various types, shapes and morphologies) at each of times T1-T4, which times may be, e.g., triggered when the condition(s) are met. In some embodiments, one or more signals may be generated based on parameters that relate to a specified (or otherwise identified) time period. For example, in plot 854, a signal may be identified in association with each of time periods 1-3, which may, e.g., based on the data stream of waveform 858, and may be set or identically sized time periods (or otherwise). Condition(s) upon with signals, and associated data values, may be based on, e.g., waveform parameters (e.g., being above or below a threshold for the entire period, having an average value above or below a threshold for the time period, etc.). As described herein, many other examples are possible, with, e.g., a combination of thinking and movement or action based conditions for signaling, signaling over a longer period of time or with delays between signaling periods, secondary signals used in generating primary signal sets or sequences, etc.

Figure 9:
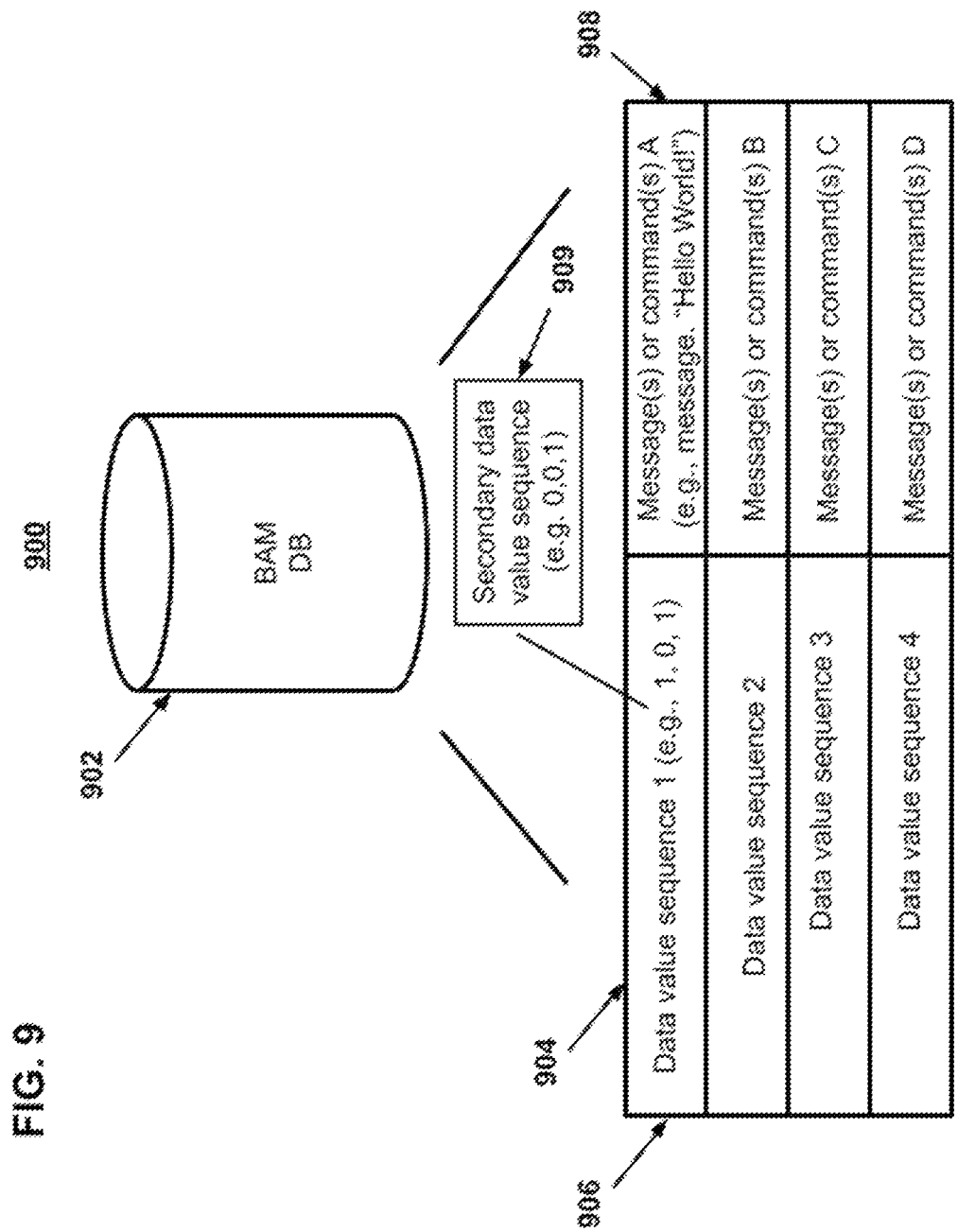
FIG. 9 illustrates a simplified example BAM database storing bit sequences and associated messages or commands.

FIG. 9 illustrates a BAM database 902 storing data value sequences and associated messages or commands, in accordance with some embodiments of the invention. As depicted, the BAM database 902 may store data structures, or arrays, tables, mapping and associating particular data value sequences (e.g, sequences 1-4) with particular message(s) or command(s) (e.g., message(s) or command(s) A-D, which may be associated, respectively, with sequences 1-4). For example, the database may store a table with rows and with two columns, where one column indicates the sequence and the second column indicates the associated message(s) or command(s). For example, sequence 906 (e.g., 1, 0, 1, which may represent a sequence of three data values, each being a binary and capable of having a value of 0 or 1) may map to, e.g., a message(s) or command(s) A 908, which may be a message, such as, "I'm generating this message using a BAM system." It is noted that, in some embodiments, a BAM system can be used for messaging or command unrelated or related to the messaging or commanding itself (e.g., a message or command relating to the format or style of a message or command to be sent). It is noted that, in various embodiments, various types of BAM databases, including mapping databases, and different types of mapping, may be used, including for different reasons. For example, in some embodiments, sets of condition(s) (e.g., relating to biosignal related data, as described herein) may be mapped to specific thinking that generates the sets of condition(s), such as in connection with identified or identifying specific thinking at least in part based on associated sets of condition(s).

Furthermore, as described above, in some embodiments, one or more of the data values of the sequence 906 (which may be called a primary data value sequence, in that it is the set or sequence that corresponds with a message or a command), may be generated based on a secondary set or sequence of data values (based on signals)—e.g., the first "1" in the data value sequence 906 may be generated by a secondary set of generated and obtained data values, such as the sequence (0, 0, 1) 909.

Furthermore, in some embodiments, a data value set or sequence (e.g., sequence 1) may be associated with or map to, rather than an individual message or command, instead a, e.g., group, topic, or category of messages or commands, or a subgroup, subtopic, subcategory, etc. For example, if a particular sequence maps to "paint" then that sequence might map to, rather than "message(s) or command(s) A", instead to a submenu of particular messages or commands, e.g., "paint in the color blue," "paint in the color yellow," etc. As such, in some embodiments, a signal, signal group or sequence may map to, and may be used to indicate a group, category, etc. of messages or commands or may map to an individual one or more messages or commands. For example, a user may first generate a sequence mapped to "paint," then a submenu may appear (which may be associated with additional table(s) in the stored database) that may provide mapping of sequences to particular colors, and there could even be more layers of submenus, e.g., to select shades of colors, where, e.g., particular message(s) or command(s) are selected.

Figure 10:
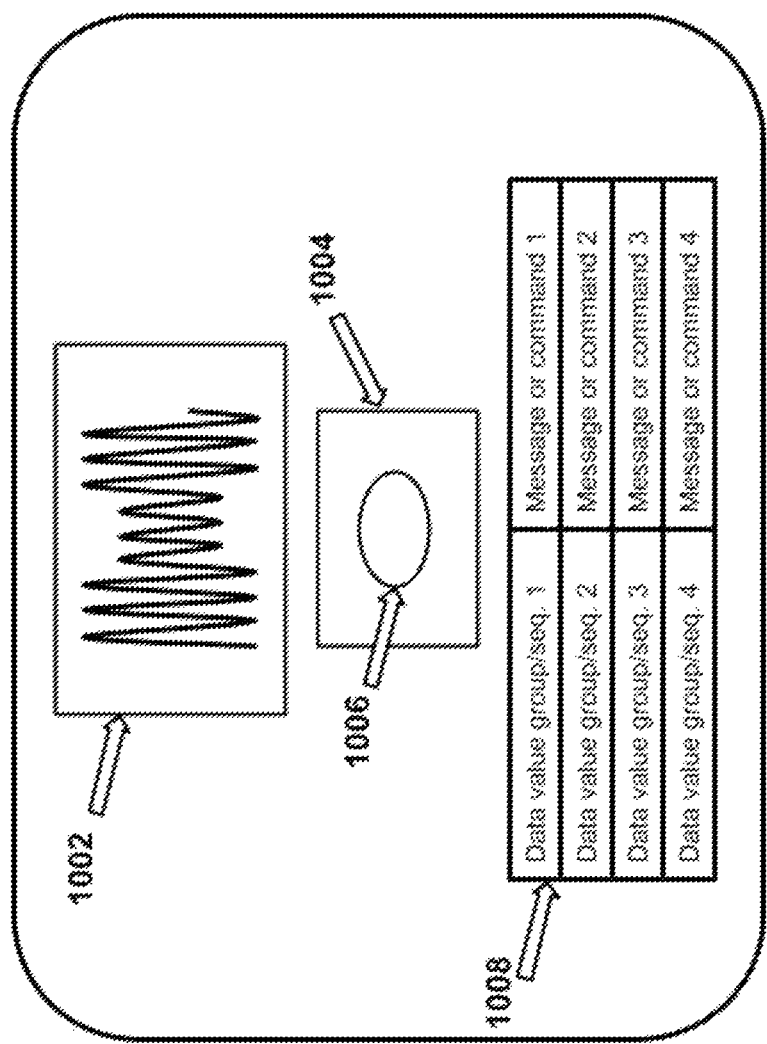
FIG. 10 illustrates simplified example BAM display(s)/GUI(s).

FIG. 10 illustrates a simplified example BAM display or GUI 1000, such as may, e.g., be displayed on a monitor or screen of a device or system.

As depicted, the display GUI 1000 may include, among other things, a displayed thinking related waveform 1002 (e.g., examples of which are shown in FIGS. 6-8), displayed data 1008 such as may be obtained or derived from a BAM database (e.g, an example of which is shown in FIG. 9), and one or more user-interactive GUI-based tools 1004 or tool areas for the user. As depicted, the tools 1004 may include one or more images, shapes or patterns, such as the simplified depicted oval 1006. In some embodiments, features or characteristics of a shape, such as the oval 1006, may correspond to varying data for the user in use of the BAM system. For example, in some embodiments, aspects of the oval 1006 may be for use by the user in, e.g., testing and optimizing the thinking to be used for signal generation. For example, the oval may grow larger as the tracked parameter value stays within a desired range for a longer time, or as it stays within a narrower and more desired range, etc., or the color or shape may vary to indicate other data that may be useful for the user to know or visualize in such optimization. Furthermore, the oval 1006 or some other shape or pattern could be used in other ways and for other purposes such as in connection with the BAM system or it's use or operation, such as in testing particular bit grouping, sequences or lengths, or the amount of time, reliability or variability with which messages or commands can be generated, etc.

Additionally, many other types of GUIs and visualization tools may be provided to the other, including, for example, GUIs to allow the user to define or specify particular messages or commands, and bit groupings or sequences that map to each command. Furthermore, in some embodiments, the customized aspects can be customized for a particular application or use, or may customized sets of features or preferences can be saved for many different applications or uses, such as, by application or use, different tables 1008 of data value groupings or sequences and mapping to application or use specific messages or commands, etc.

In various embodiments, mapping of bit groups or sequences to messages or commands enables massive scalability and efficiency. For example, a binary sequence of just 8 individual signals allows 2 to the power of 8, or 256, individual sequences, each of which could map to a particular message or command, for example (which can, for example, in some ways, be analogous to bits and bytes). As such, with just 8 generated signals, each of which may take only seconds (or fractions of a second) to generate, a user could select any of, e.g., 256 predefined messages or commands. A 10 signal group or sequence allows for over 1,000 mapped messages or commands. In some embodiments, with just a small number of needed signals, what may amount to a rich and diverse language of messages or commands may be generated.

Figure 11:
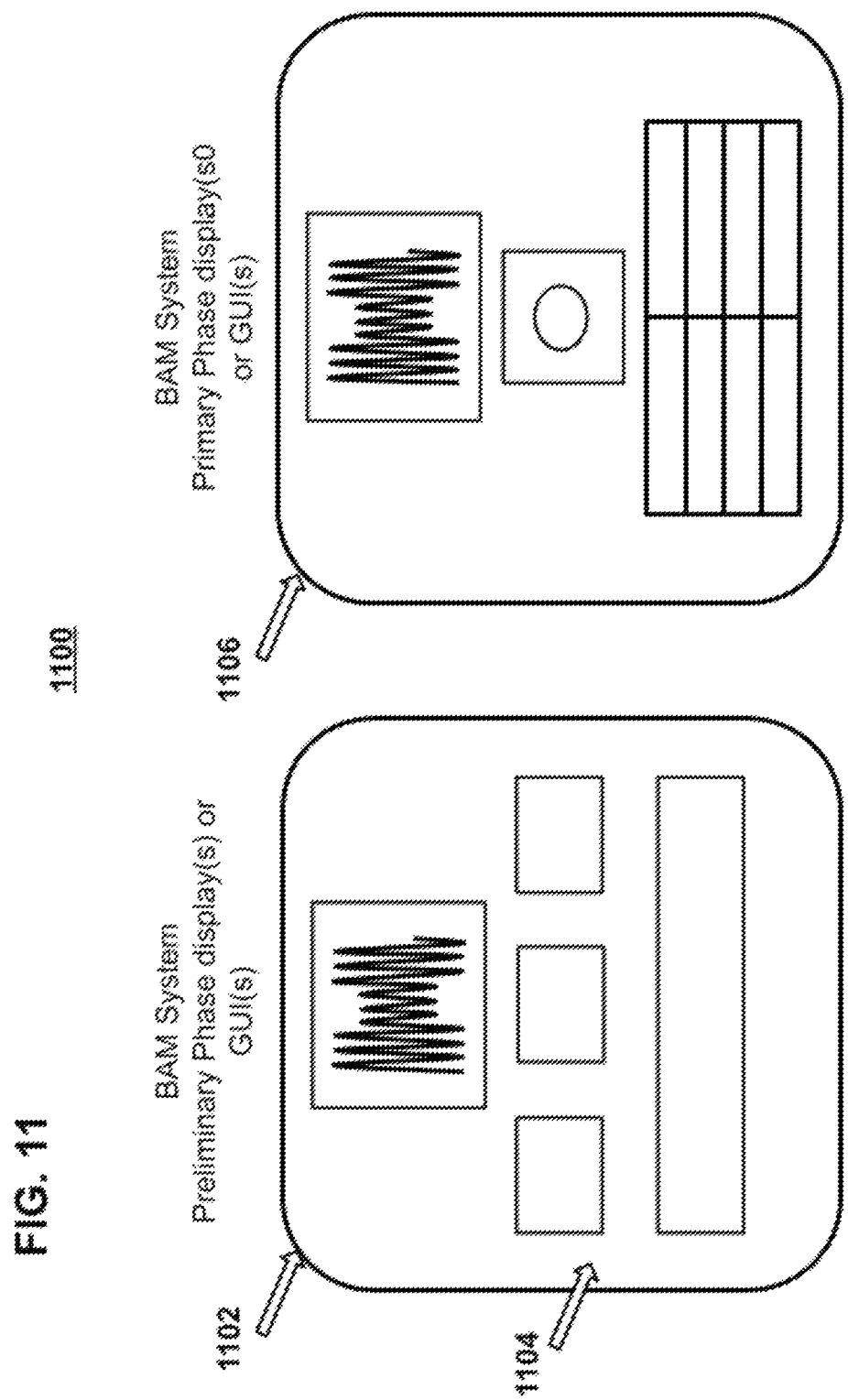
FIG. 11 illustrates two simplified example BAM displays/GUIs, including a preliminary phase display/GUI and a primary phase display/GUI.

FIG. 11 illustrates two simplified example BAM displays/GUIs (or sets thereof), including preliminary phase display(s) or GUI(s) 1102, including, e.g., user-interactive tools or tool areas 1104, and primary phase (or primary mode) display(s) or GUI(s) 1106, which may be, or be similar to, for example, the display(s) or GUI(s) 1000 of FIG. 10.

In some embodiments, the preliminary phase may be used to specify one or more types, manners or modes of operation or use of the primary phase. For example, in some embodiments, the preliminary phase may be used in specifying how communication with, or data entry or providing to in the primary phase, is accomplished. For example, in some embodiments, a user may use the preliminary phase to specify how, e.g., particular signals, signal groups or sequences are entered or communicated to the system in the primary phase—e.g., by mouse use and typing, or even by thinking. For example, in some embodiments, a user may use the preliminary phase to specify specific thinking to be used in generating signals and messages or commands to be communicated to the BAM system in the primary phase. As such, in some embodiments, a form or portion of a BAM system (e.g., the preliminary phase) may be used in setting up or configuring a primary phase of the BAM system—e.g., using BAM system for setting up configuring a BAM system itself or another portion thereof.

In some embodiments, a BAM system may include or provide suggested, template, automatic, initial or preset parameters for use with the BAM system, e.g., a suggested rhythm or parameter to use in signaling. This may, for example, be useful in allowing a user to set up, configure, calibrate, test or optimize aspects of a BAM system faster, more easily, more efficiently or with less or no potential assistance.

Furthermore, in some embodiments, a BAM system may allow (e.g., including one or more GUIs enabling) a user to set up shortcuts, where, for example, a user may set up a shorter sequence than is normally used to map to a particular message or command that the user may wish to use frequently, and so may wish to generate relatively easily. In some embodiments, various shortcuts can be of a temporary nature, so that the user can set them for a particular use or time, or modify them at will, e.g., to return to the setup prior to the setting of the shortcuts.

As such, in some embodiments, a BAM system may include both a preliminary or set-up oriented display or GUI (or set of displays or GUIs) (or preliminary mode or set-up mode), as well as a primary phase display or GUI (or set of displays/GUIs). The preliminary display or GUI may be directed to allowing simplified or relatively easy set up, such as may include, e.g., testing and optimization of parameters for use in signaling, specifying signaling aspects, specifying messages or commands associated with signal groups or sequences, or other aspects of operation of a BAM system in, e.g., messaging or commanding, setting preferences or customizations, etc. In some embodiments, tools 1104 of a preliminary phase display or GUI 1102 may be directed to allowing a user, with or without assistance, to set up or configure the BAM system, such as, e.g, prior to use in messaging or commanding, or to make configuration or set-up changes between or during messaging or commanding. As such, in some embodiments, the preliminary phase display or GUI 1102 of the BAM system may be used, whether by the user alone or with the help of one or more assistants (a type of user), in setting up or customizing aspects or operation of the primary phase display or GUI 1106, or other aspects of operation of the BAM system in messaging or commanding.

In some embodiments, the system may provide, e.g., a display/GUI(s) based aspect, e.g., homepage or the like, in which the user can select or identify various applications that the BAM system will be used for (e.g., messaging to a device, controlling a robot, etc.). Furthermore, in some embodiments, the user may be able to use specific thinking based signaling, as described in embodiments herein, to communicate with, interact with, command, provide or enter data to, or navigate the, e.g., homepage. The homepage may also, e.g., allow or facilitate allowing the user to set up mapping (signal(s) to messages or commands) for each of the designated applications, as well as, e.g., other customizations or, e.g., shortcuts.

Figure 12:
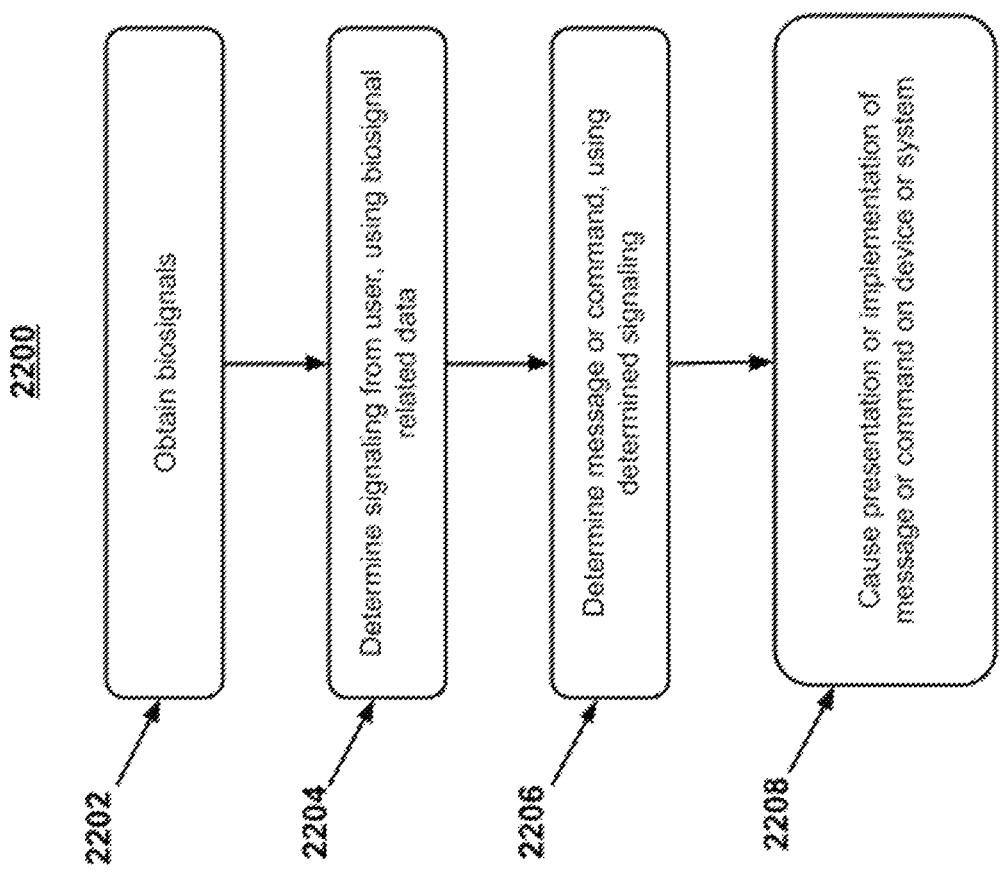
FIGS. 12-13 are flow diagrams illustrating example BAM methods.
Figure 13:
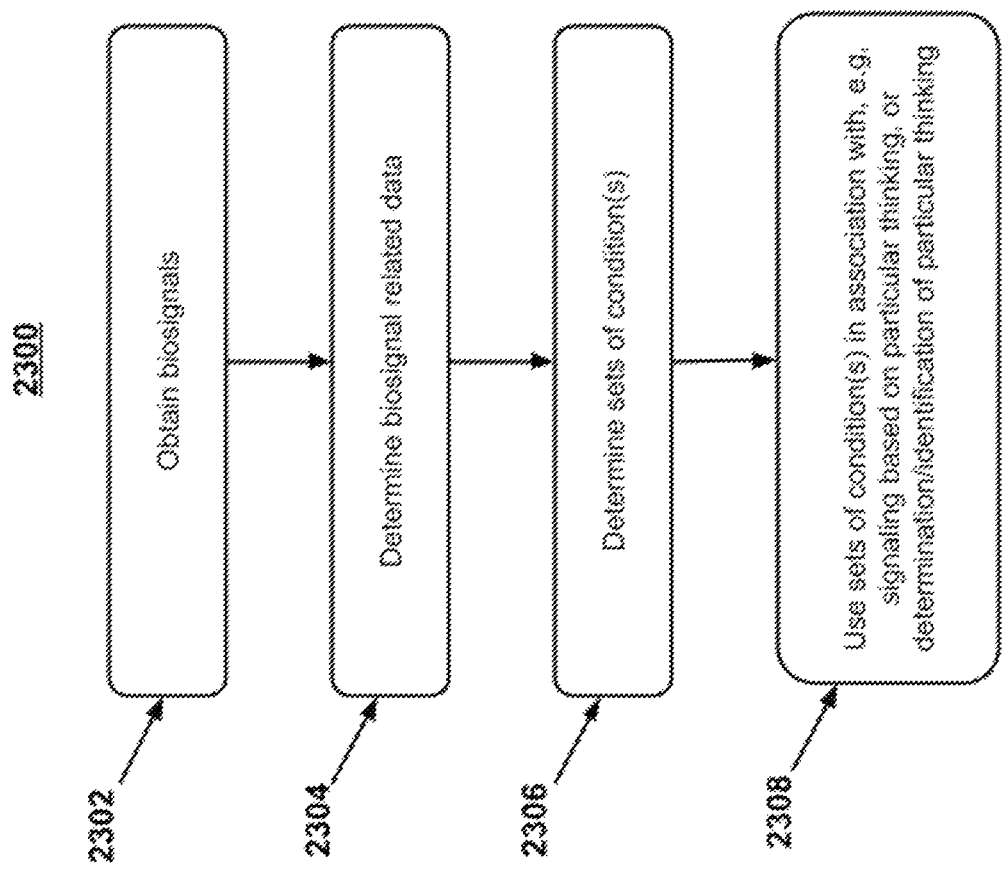

FIGS. 12-13 are flow diagrams 2200, 2300 illustrating operation of an example BAM system, in accordance with some embodiments of the invention, such as may be implemented at least in part by a BAM system or one or more algorithms thereof.

In the method 2200 shown in FIG. 12, at step 2202, a BAM system obtains biosignals from a user. At step 2204, the BAM system determines signaling from the user, using biosignal related data (e.g., biosignal data or data derived at least in part therefrom), which may include, e.g., using one or more determined set(s) of conditions relating to features of the biosignal related, and determining signaling from the user associated with using specific thinking in signaling by causing satisfaction of a set of conditions associated with a desired message or command. At step 2206, the BAM system determines a message or command, using the determined signaling, such as may include use of a mapping database. At step 2208, the BAM system causes presentation or implementation of the message or command on a device or system.

In the method 2300 shown in FIG. 13, at step 2302, a BAM system obtains biosignals from a user. At step 2304, the BAM system determines biosignal related data. At step 2306, the BAM system determines sets of condition(s) associated with the biosignal related data. At step 2308, the BAM system uses the sets of condition(s) in association with, e.g., signaling based on particular/specific thinking, and/or in determination of particular/specific thinking, examples of which are described herein.

Figure 14:
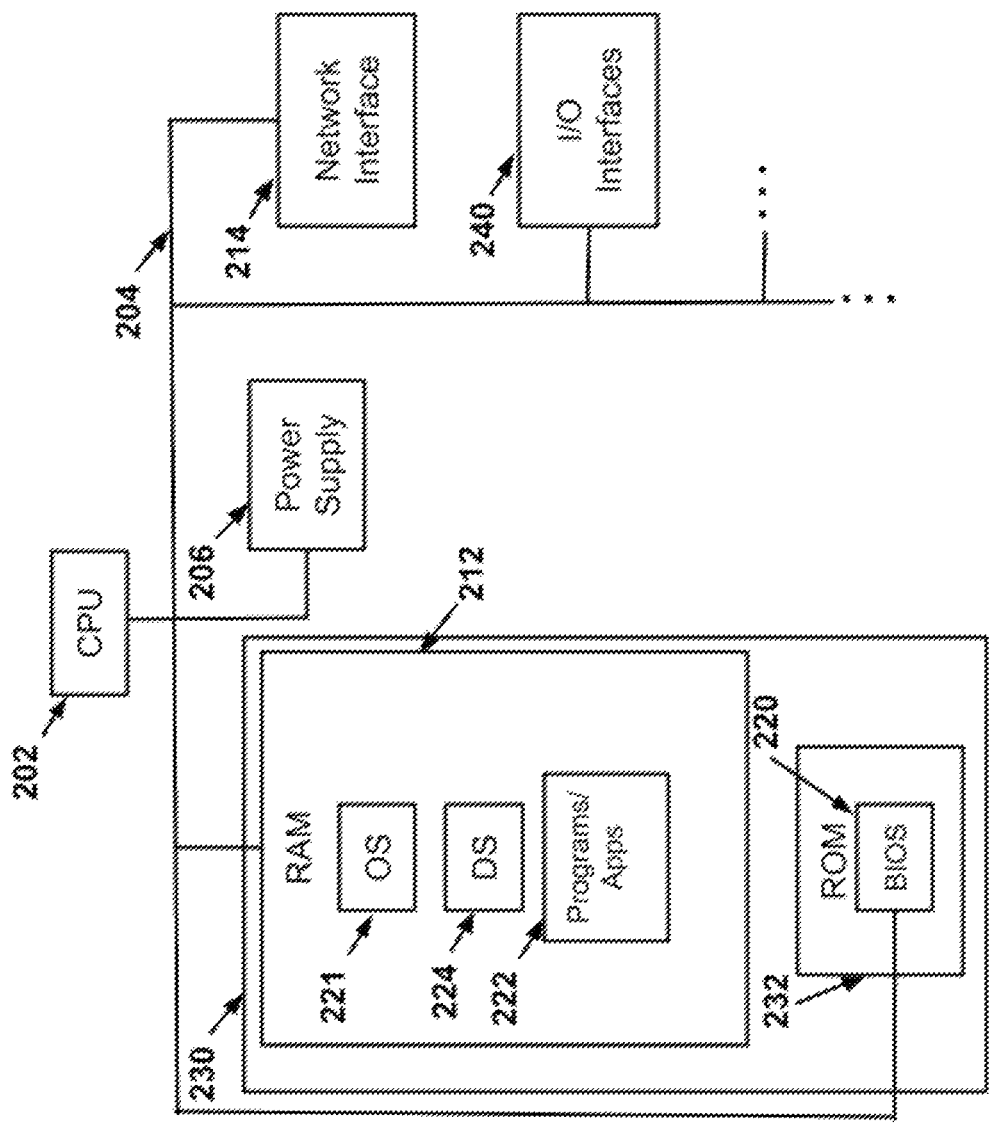
FIG. 14 is a block diagram of an example electronic device that can implement one or more aspects of a BAM system or method.

FIG. 14 illustrates a block diagram of an electronic device 1400 that can implement one or more aspects of devices and systems, such as BAM systems, according to some embodiments described herein. In general, an electronic device, computer or computerized system may include a processor 202, memory 230, a power supply 206, and input/output (I/O) components 240, e.g., microphones, speakers, displays, touchscreens, keyboards, keypads, GPS components, etc., which may be operable, for example, to provide graphical user interfaces, random access memory 212, operating system(s) 221, data storage 224 (other data storage may also be included), and programs and/or applications 222, read only memory 232, and basic input/output system 220. The electronic device 200 can also include a communications bus 204 that connects elements of the electronic device 200. Network interfaces 214 can include a receiver and a transmitter (or transceiver), and an antenna for wireless communications.

Components of systems according to various embodiments (e.g., devices, systems and components of the systems of FIGS. 1-3, including BAM systems, BAM managers, monitor/presentation devices/systems, display/GUIs, computers, CPUs, memories, other computer components), computerized systems, BAM databases, and brain activity monitoring systems, including, for example, components 154, 168, 160 and 164 as shown in FIG. 1), examples of which are depicted in the foregoing figures, including, e.g., electronic devices, computerized devices, computers, servers, monitors, databases, etc., may include one or more Local Area Networks ("LANs")/Wide Area Networks ("WANs"), one or more wireless networks, one or more wired or wireless client devices, mobile or other wireless client devices, servers, and may include or communicate with one or more data stores or databases. Various of the client devices may include, for example, desktop computers, laptop computers, set top boxes, tablets, cell phones, smart phones, computer systems, robotic systems, various electrical, mechanical and electromechanical systems, and others. The servers can include, for example, one or more application servers, content servers, search servers, and the like.

In general, devices, including electronic devices and computerized devices including computers, can include a processor/CPU, memory, a power supply, and input/output (I/O) components/devices, e.g., monitors, microphones, speakers, displays, graphical user interfaces (GUUs), touchscreens, keyboards, mice, keypads, microscopes, GPS components, etc., which may be operable, for example, to provide graphical user interfaces or text user interfaces. The electronic device can also include a communications bus that connects the aforementioned elements of the electronic device. Network interfaces can include a receiver and a transmitter (or transceiver), and one or more antennas for wireless communications. The processor of an electronic or computerized device can include one or more of any type of processing device, e.g., a Central Processing Unit (CPU), and a Graphics Processing Unit (GPU). Also, for example, the processor can be central processing logic, or other logic, may include hardware, firmware, software, or combinations thereof, to perform one or more functions or actions, or to cause one or more functions or actions from one or more other components. Also, based on a desired application or need, central processing logic, or other logic, may include, for example, a software controlled microprocessor, discrete logic, e.g., an Application Specific Integrated Circuit (ASIC), a programmable/programmed logic device, memory device containing instructions, etc., or combinatorial logic embodied in hardware. Furthermore, logic may also be fully embodied as software. The memory of an electronic or computerized device, which can include Random Access Memory (RAM) and Read Only Memory (ROM), can be enabled by one or more of any type of memory device, e.g., a primary (directly accessible by the CPU) or secondary (indirectly accessible by the CPU) storage device (e.g., flash memory, magnetic disk, optical disk, and the like). The RAM can include an operating system, data storage, which may include one or more databases, and programs and/or applications, which can include, for example, software aspects of a BAM program, as described with reference to various embodiments described herein. The ROM can also include Basic Input/Output System (BIOS) of the electronic device.

Software aspects of a BAM manager may include or represent any or all programming, applications, algorithms, models, software and other tools necessary to implement or facilitate methods and systems according to embodiments of the invention. The elements may exist on a single server computer/device or be distributed among multiple computers/devices, servers, devices or entities, such as systems and engines as described in embodiments herein. The power supply of an electronic or computerized device may contain one or more power components, and facilitates supply and management of power to the electronic or computerized device. The input/output components of an electronic or computerized device, including Input/Output (I/O) interfaces, can include, for example, any interfaces for facilitating communication between any components of the device, components of external devices, and end users. For example, such components can include a network card that may be an integration of a receiver, a transmitter, a transceiver, and one or more input/output interfaces. A network card, for example, can facilitate wired or wireless communication with other devices of a network. In cases of wireless communication, an antenna can facilitate such communication. Also, some of the input/output interfaces and the bus can facilitate communication between components of the device, and in an example can ease processing performed by the processor. Where the device is a server, it can include a computing device that can be capable of sending or receiving signals, e.g., via a wired or wireless network, or may be capable of processing or storing signals, e.g., in memory as physical memory states. The server may be an application server that includes a configuration to provide application(s), via a network to another device. Also, an application server may, for example, host a Web site that can provide a user interface for administration of example aspects of the systems and methods for interactive video generation and rendering.

Any computing device capable of sending, receiving, and processing data over a wired and/or a wireless network may act as a server, such as in facilitating aspects of implementations of the systems and methods for interactive video generation and rendering. Thus, devices acting as a server may include devices such as dedicated rack-mounted servers, desktop computers, laptop computers, set top boxes, integrated devices combining one or more of the preceding devices, and the like. Servers may vary widely in configuration and capabilities, but they generally include one or more central processing units, memory, mass data storage, a power supply, wired or wireless network interfaces, input/output interfaces, and an operating system such as Windows Server, Mac OS X, Unix, Linux, FreeBSD, and the like. A server may include, for example, a device that is configured, or includes a configuration, to provide data or content via one or more networks to another device, such as in facilitating aspects of example systems and methods for interactive video generation and rendering. One or more servers may, for example, be used in hosting a Web site. Servers may also, for example, provide a variety of services, such as Web services, third-party services, audio services, video services, email services, HTTP or HTTPS services, Instant Messaging (IM) services, Short Message Service (SMS) services, Multimedia Messaging Service (MMS) services, File Transfer Protocol (FTP) services, Voice Over IP (VOIP) services, calendaring services, phone services, and the like, all of which may work in conjunction with example aspects of an example systems and methods for interactive video generation and rendering. Content may include, for example, text, images, audio, video, and the like. Client devices may include, for example, any computing device capable of sending and receiving data over a wired and/or a wireless network. Such client devices may include desktop computers as well as portable devices such as cellular telephones, smart phones, display pagers, Radio Frequency (RF) devices, Infrared (IR) devices, Personal Digital Assistants (PDAs), handheld computers, GPS-enabled devices tablet computers, sensor-equipped devices, laptop computers, set top boxes, wearable computers, integrated devices combining one or more of the preceding devices, and the like.

Client and other devices may range widely in terms of capabilities and features. For example, a cell phone, smart phone or tablet may have a numeric keypad and a few lines of monochrome Liquid-Crystal Display (LCD) display on which only text may be displayed. In another example, a Web-enabled client device may have a physical or virtual keyboard, data storage (such as flash memory or SD cards), accelerometers, gyroscopes, GPS or other location-aware capability, and a 2D or 3D touch-sensitive color screen on which both text and graphics may be displayed. Client and other devices may run a variety of operating systems, including personal computer operating systems such as Windows, iOS or Linux, and mobile operating systems such as iOS, Android, Windows Mobile, and the like. Client devices may be used to run one or more applications that are configured to send or receive data from another computing device. Client applications may provide and receive textual content, multimedia information, and the like. Client applications may perform actions such as browsing webpages, using a web search engine, interacting with various apps stored on a smart phone, sending and receiving messages via email, SMS, or MMS, playing games, receiving advertising, watching locally stored or streamed video, or participating in social networks.

A network may, e.g., be enabled to employ any form of computer readable media for communicating information from one electronic device to another. The computer readable media may be non-transitory. A network may include the Internet in addition to Local Area Networks (LANs), Wide Area Networks (WANs), direct connections, such as through a Universal Serial Bus (USB) port, other forms of computer-readable media, or any combination thereof. On an inter-connected set of LANs, including those based on differing architectures and protocols, a router acts as a link between LANs, enabling data to be sent from one to another. Communication links within LANs may include twisted wire pair or coaxial cable, while communication links between networks may utilize analog telephone lines, cable lines, optical lines, full or fractional dedicated digital lines including T1, T2, T3, and T4, Integrated Services Digital Networks (ISDNs), Digital Subscriber Lines (DSLs), wireless links including satellite links, optic fiber links, or other communications links known to those skilled in the art. Furthermore, remote computers and other related electronic devices could be remotely connected to either LANs or WANs via a modem and a telephone link.

A wireless network may employ stand-alone ad-hoc networks, mesh networks, Wireless LAN (WLAN) networks, cellular networks, and the like. A wireless network may further include an autonomous system of terminals, gateways, routers, or the like connected by wireless radio links, or the like. These connectors may be configured to move freely and randomly and organize themselves arbitrarily, such that the topology of wireless network may change rapidly. A wireless network may further employ a plurality of access technologies including 2nd (2G), 3rd (3G), 4th (4G) generation, Long Term Evolution (LTE) radio access for cellular systems, WLAN, Wireless Router (WR) mesh, and the like. Access technologies such as 2G, 2.5G, 3G, 4G, and future access networks may enable wide area coverage for client devices, such as client devices with various degrees of mobility. For example, a wireless network may enable a radio connection through a radio network access technology such as Global System for Mobile communication (GSM), Universal Mobile Telecommunications System (UMTS), General Packet Radio Services (GPRS), Enhanced Data GSM Environment (EDGE), 3GPP Long Term Evolution (LTE), LTE Advanced, Wideband Code Division Multiple Access (WCDMA), Bluetooth, 802.11b/g/n, and the like. A wireless network may include virtually any wireless communication mechanism by which information may travel between client devices and another computing device, network, and the like. Internet Protocol (IP) may be used for transmitting data communication packets over a network of participating digital communication networks, and may include protocols such as TCP/IP, UDP, DECnet, NetBEUI, IPX, Appletalk, and the like. Versions of the Internet Protocol include IPv4 and IPV6. The Internet includes local area networks (LANs), Wide Area Networks (WANs), wireless networks, and long haul public networks that may allow packets to be communicated between the local area networks. The packets may be transmitted between nodes in the network to sites each of which has a unique local network address. A data communication packet may be sent through the Internet from a user site via an access node connected to the Internet. The packet may be forwarded through the network nodes to any target site connected to the network provided that the site address of the target site is included in a header of the packet. Each packet communicated over the Internet may be routed via a path determined by gateways and servers that switch the packet according to the target address and the availability of a network path to connect to the target site.

A distributed computer system may, e.g., include a collection of autonomous computers linked by a network or networks, together with the software, systems, protocols and techniques designed to facilitate various services, such as the storage, caching, or transmission of content, streaming media and applications on behalf of content providers. Such services may make use of ancillary technologies including, but not limited to, "cloud computing," distributed storage, DNS request handling, provisioning, data monitoring and reporting, content targeting, personalization, and business intelligence. A CDN may also enable an entity to operate and/or manage a third party's Web site infrastructure, in whole or in part, on the third party's behalf.

While certain embodiments have been described, these embodiments have been presented by way of example only and are not intended to limit the scope of the present disclosures. Novel methods, apparatuses and systems described herein can be embodied in a variety of other forms; furthermore, various omissions, substitutions and changes in the form of the methods, apparatuses and systems described herein can be made without departing from the spirit of the present disclosures. The accompanying claims and their equivalents are intended to cover such forms or modifications as would fall within the scope and spirit of the present disclosures.

What is claimed is:

1. A system comprising:
   a brain activity monitoring device or system configured to obtain data relating to at least one parameter relating to brain activity of a user; and
   at least one computer or computerized system, communicatively coupled with the brain activity monitoring device or system, comprising at least one processor and at least one memory, the at least one processor being configured to:
      based at least in part on at least a portion of the obtained data, obtain from the user two or more signals, wherein each of the two or more signals is generated by the user at least in part by the user engaging in specific thinking to cause one or more values of one or more parameters relating to the brain activity of the user to meet one or more specified conditions, wherein the one or more parameters are associated with the at least one parameter;
      determine two or more data values, wherein each data value of the two or more data values corresponds with a signal of the two or more signals;
      based at least in part on at least two of the two or more data values, determine a set of at least two data values, wherein determining the set of at least two data values comprises forming the set of at least two data values;
      based at least in part on the set of at least two data values, determine a message for presentation or a command for implementation, on at least one system or device; and
      determine output at least in part for causing presentation of the message or implementation of the command on the at least one system or device;
   wherein that which is thought in the specific thinking is not required to be related to the message or the command.

2. The system of claim 1, wherein the output comprises at least one data signal.

3. The system of claim 2, wherein the system is configured to send the at least one data signal to the at least one system or device for, at least in part, causing the presentation of the message or implementation of the command, wherein sending the at least one data signal to the at least one system or device comprises at least one of: sending to the at least one system or device without sending to any intermediary systems or devices, and sending to the at least one system or device via one or more intermediary systems or devices.

4. The system of claim 1, comprising at least one controller, wherein the at least one controller comprises the at least one processor and the at least one memory.

5. The system of claim 1, wherein the at least one computer or computerized system is at least one of: at least in part physically integrated with the brain activity monitoring device or system, physically separate from at least a portion of the brain activity monitoring device or system, at least in part physically integrated with the at least one system or device, and physically separate from at least a portion of the at least one system or device.

6. The system of claim 1, wherein the message or the command corresponds with the set of at least two data values.

7. The system of claim 1, wherein the at least one processor is configured to:
   obtain the two or more signals, wherein the two or more signals are generated by the user for causing the message to be presented or the command to be implemented on the at least one system or device.

8. The system of claim 1, wherein the set of at least two data values is at least one of: a set that includes only data values that correspond with signals of the two or more signals, a set that includes at least one data value that does not correspond with a signal of the two or more signals, and a set that includes no data value that corresponds with a signal of the two or more signals.

9. The system of claim 1, wherein at least one of: the set of at least two data values comprises a sequence of at least two data values, and each data value of the set of at least two data values is capable of having one of at least two values.

10. The system of claim 1, wherein the brain activity monitoring device or system comprises utilizes at least one of: invasive brain activity monitoring, non-invasive brain activity monitoring, partially invasive brain activity monitoring, electroencephalography (EEG), EEG with electrodes placed on the surface of the scalp, EEG with electrodes placed under the skin, intracranial EEG (iEEG), subdural EEG, depth EEG, a microelectrode array, electrocorticography (ECoG), magnetoencephalography (MEG), electrooculography (EOG), magnetic resonance imaging (MRI), tomography, imaging, spectrography, positron emission tomography (PET), functional magnetic resonance imaging (fMRI), functional ultrasound imaging (fUS), and single photon emission computed tomography (SPECT).

11. The system of claim 1, wherein the at least one processor is configured to use at least one artificial intelligence algorithm in at least one of: obtaining the two or more signals from the user, determining the one or more parameters, determining the one or more values of one or more parameters, determining the one or more specified conditions, determining the two or more data values, determining the set of at least two data values, identifying the message or the command, identifying the at least one system or device, communicating with the brain activity monitoring device or system, communicating with the at least one system or device, and determining the specific thinking prior to the user engaging in the specific thinking to cause the one or more values of the one or more parameters relating to the brain activity of the user to meet the one or more specified conditions.

12. The system of claim 1, wherein the at least one parameter relating to the brain activity of the user relates to at least one of: electrical activity, electromagnetic activity, magnetic activity, chemical activity, oxygen usage, electrochemical activity, and blood flow.

13. The system of claim 1, wherein the at least one processor is configured to:
obtain from the user the two or more signals, wherein each of the two or more signals is generated by the user only by the user engaging in the specific thinking.

14. The system of claim 1, wherein the at least one processor is configured to:
obtain from the user the two or more signals, wherein at least one of the two or more signals is generated based in part on physical movement of the user.

15. The system of claim 1, wherein the at least one processor is configured to:
obtain the two or more signals, wherein that which is thought in the specific thinking comprises at least one of: a specific concept or a specific mental activity.

16. The system of claim 1, wherein the at least one processor is configured to:
obtain the two or more signals, wherein the specific thinking is determined prior to the user engaging in the specific thinking to cause the one or more values of the one or more parameters relating to the brain activity of the user to meet the one or more specified conditions.

17. The system of claim 1, wherein the at least one processor is configured to:
obtain the two or more signals at least in part to optimize signal generation.

18. The system of claim 1, wherein the one or more parameters is at least one of: made up of the at least one parameter, and are determined based at least in part on the at least one parameter.

19. A system comprising:
a brain activity monitoring device or system configured to obtain data relating to at least one parameter relating to brain activity of a user; and
at least one computer or computerized system, communicatively coupled with the brain activity monitoring device or system, comprising at least one processor and at least one memory, the at least one processor being configured to:
based at least in part on at least a portion of the obtained data, obtain from the user a set of two or more signals, wherein each of the set of two or more signals is generated by the user at least in part by the user engaging in specific thinking to cause one or more values of one or more parameters relating to the brain activity of the user to meet one or more specified conditions, wherein the one or more parameters are associated with the at least one parameter;
determine a set of at least two data values, wherein determining the set of at least two data values comprises forming the set of at least two data values, and wherein each data value of the set of at least two data values corresponds with a signal of the set of two or more signals;
determine a message for presentation or a command for implementation, on at least one system or device, that corresponds with the set of at least two data values; and
determine output at least in part for causing presentation of the message or implementation of the command on the at least one system or device;
wherein that which is thought in the specific thinking is not required to be related to the message or the command.

20. The system of claim 19, wherein the set of at least two data values comprises a sequence of at least two data values.

21. A system comprising:
at least one computer or computerized system, comprising at least one processor and at least one memory, the at least one processor being configured to:
receive data relating to at least one parameter relating to monitored brain activity of a user;
based at least in part on at least a portion of the received data, obtain from the user two or more signals, wherein each of the two or more signals is generated by the user at least in part by the user engaging in specific thinking to cause one or more values of one or more parameters relating to the brain activity of the user to meet one or more specified conditions, wherein the one or more parameters are associated with the at least one parameter;
determine two or more data values, wherein each data value of the two or more data values corresponds with a signal of the two or more signals;
based at least in part on at least two of the two or more data values, determine a set of at least two data values, wherein determining the set of at least two data values comprises forming the set of at least two data values; and
based at least in part on the set of at least two data values, determine a message for presentation or a command for implementation, on at least one system or device; and
determine output at least in part for causing presentation of the message or implementation of the command on the at least one system or device;
wherein that which is thought in the specific thinking is not required to be related to the message or the command.

22. A method comprising:
receiving data relating to at least one parameter relating to monitored brain activity of a user;
obtaining from the user, by at least one processor of at least one computer or computerized system, the at least one computer or computerized system being communicatively coupled with a brain activity monitoring device or system, based at least in part on at least a portion of the received data, two or more signals, wherein each of the two or more signals is generated by the user at least in part by the user engaging in specific thinking to cause one or more values of one or more parameters relating to the brain activity of the user to meet one or more specified conditions, wherein the one or more parameters are associated with the at least one parameter;
determining, by the at least one processor, two or more data values, wherein each data value of the two or more data values corresponds with a signal of the two or more signals;
determining, by the at least one processor, based at least in part on at least two of the two or more data values, a set of at least two data values, wherein determining the set of at least two data values comprises forming the set of at least two data values;
determining, by the at least one processor, based at least in part on the set of at least two data values, a message for presentation or a command for implementation, on at least one system or device; and
determining, by the at least one processor, output at least in part for causing presentation of the message or implementation of the command on at the least one system or device;
wherein that which is thought in the specific thinking is not required to be related to the message or the command.

23. The method of claim 22, wherein the set of at least two data values comprises a sequence of at least two data values.

* * * * *